US010503794B2

(12) United States Patent
Provost et al.

(10) Patent No.: US 10,503,794 B2
(45) Date of Patent: Dec. 10, 2019

(54) VIDEO CONTENT OPTIMIZATION SYSTEM AND METHOD FOR CONTENT AND ADVERTISEMENT PLACEMENT IMPROVEMENT ON A THIRD PARTY MEDIA CONTENT PLATFORM

(71) Applicant: Diginary Software, LLC, Midlothian, VA (US)

(72) Inventors: Alison Jane Provost, Richmond, VA (US); Jeffrey Alan Martin, Bedford, TX (US); Hitesh Kulkarni, Bloomfield, NJ (US); James Michael Waltman, St. Paul, TX (US); Ajoy Thomas, Houston, TX (US); Gregory McKillop Spear, New York, NY (US); Judi Lee Costanza, Monaca, PA (US); Chasity Friend Stevens, Pulaski, VA (US); Simon Tso, Brooklyn, NY (US)

(73) Assignee: Diginary Software, LLC, Richmond, VA (US)

( * ) Notice: Subject to any disclaimer, the term of this patent is extended or adjusted under 35 U.S.C. 154(b) by 572 days.

(21) Appl. No.: 14/688,585

(22) Filed: Apr. 16, 2015

(65) Prior Publication Data
US 2015/0302017 A1    Oct. 22, 2015

Related U.S. Application Data

(60) Provisional application No. 61/980,812, filed on Apr. 17, 2014.

(51) Int. Cl.
*G06F 16/9535* (2019.01)
*G06F 16/958* (2019.01)
*G06F 16/2457* (2019.01)

(52) U.S. Cl.
CPC .... *G06F 16/9535* (2019.01); *G06F 16/24578* (2019.01); *G06F 16/972* (2019.01)

(58) Field of Classification Search
CPC ......... G06F 17/30867; G06F 17/30864; G06F 17/30892; G06F 17/30203; G06F 17/3053;
(Continued)

(56) References Cited

U.S. PATENT DOCUMENTS

2007/0124208 A1 *  5/2007  Schachter ......... G06F 17/30011
                                                           705/310
2008/0222283 A1 *  9/2008  Ertugrul ................ G06Q 30/02
                                                           709/224
(Continued)

OTHER PUBLICATIONS

Jesper Astrom, "11 Methods that will Increase your Youtube View Count", Nov. 9, 2009, 13 pages printed from http://jesperastrom.com/internet-marketing/the-11-free-improvements-that-will-increase-your-youtube-view-count/ on Jan. 8, 2018.*

*Primary Examiner* — Tony Mahmoudi
*Assistant Examiner* — Michael Le
(74) *Attorney, Agent, or Firm* — Christopher Pilling

(57) ABSTRACT

A system involves a network-connected service platform including a computerized server, a processor operating in the computerized server, executing instructions from a non-transitory physical medium, a data repository coupled to the network-connected server, a programmable interface operable in the service platform, enabled for two-way communication with a content platform, enabling the service platform to access and retrieve data from the content platform, and classification data and profile data stored in the data repository. The service platform, executing the instructions, retrieves data associated with specific content from the content platform, integrates the retrieved data with the classification data and profile data in the data repository,
(Continued)

creating an enhanced data set, and provides interactive interfaces to computerized appliances connecting through the network, enabling users of the computerized appliances to access, analyze and manipulate the enhanced data set, results of user analysis and manipulation providing improved understanding of characteristics of the specific content.

12 Claims, 64 Drawing Sheets

(58) Field of Classification Search
CPC .. G06F 16/9535; G06F 16/183; G06F 16/972; G06F 16/24578; G06F 16/951
USPC ........................................................ 707/731
See application file for complete search history.

(56) References Cited

U.S. PATENT DOCUMENTS

| | | | |
|---|---|---|---|
| 2008/0275763 A1* | 11/2008 | Tran .................... | G06Q 20/10 705/35 |
| 2009/0016507 A1* | 1/2009 | Altberg ................. | G06Q 30/02 379/114.01 |
| 2010/0050098 A1* | 2/2010 | Turner .................... | G06F 16/48 715/763 |
| 2011/0213655 A1 | 9/2011 | Henkin et al. | |
| 2013/0014222 A1 | 1/2013 | Bhatia et al. | |
| 2013/0151333 A1 | 6/2013 | El Kaliouby et al. | |
| 2013/0290289 A1 | 10/2013 | Yu et al. | |
| 2014/0067521 A1 | 3/2014 | Kirkby et al. | |
| 2014/0092990 A1* | 4/2014 | Vuskovic ........... | H04N 21/2743 375/240.26 |

* cited by examiner

Request an invitation >

See Your Videos
Soar On YouTube

Email: [　　　　]
Password: [　　　　]
Lost password?

[Login]

Fig. 3

See Your Videos  
Soar On YouTube

<Welcome, User>  
Logout  
Account ( Import Video )

Dashboard | Channels | Videos | Groups | Alerts | Reports

The System has already been studying this channel <Channel>. If you would like to modify the classification data use the dropdowns below:

Choose the Conversation that best describes the channel and its content.

Choose the Topic that best describes the channel and its content.

Choose the Producer Type that best describes the owner of this channel.

Choose the primary language that is used for the channel and the majority of its content.

[ < Back ]  [ Generate Report > ]

Fig. 5

Looking and Feeling Great

Fashion, Style, Apparel

Fashion Shows, News and Collections
   Jewelry & Watches
   Shopping, Premium
   Shopping, Casual/Everyday
   Lookbooks & Magazines
   Fashion History, Fashion Stories, Fashion Business
   Shoes, Handbags and Accessories
   For Men Only
   Models & Modeling
   Lingerie and Undergarments Personal Care, Beauty and Grooming Male Grooming
   Get the Look: Hair, Make Up, Skin Care How Tos
   Oral Care
   General Beauty Care and Advice
   Nail Care
   Smelling Good (deodorants, fragrances)

Fitness, Nutrition & Weight Loss

Body Building
   Yoga & Pilates
   Walking, Jogging & Running
   Weight Loss/Diet Programs
   CrossFit Programs
   Exercise Classes led by Personal Trainers
   Marathons/Triathlons
   Equipment, Wearables and Supplies

Fig. 6

See Your Videos  
Soar On YouTube

<Welcome, User>  
Logout  
Account ( Import Video )

Dashboard | Channels | Videos | Groups | Alerts | Reports

Monitor Channel

Channels  Rankings Growth Search Ranks

Channel 1
Channel 2
Channel 3

| Monthly Report | Top Keywords | Keyword 1 | Keyword 2 |
|---|---|---|---|
| Baseline Rankings: | | 20 Baseline video | 18 Baseline video |
| | | 5 Top ranked video | 5 Top ranked video |
| | | 6 Next ranked video | 10 Next ranked video |
| | | 9 Next ranked video | 9 Next ranked video |
| | | | |

View Report
( Options Menu )
( Historical Report )

Keyword Refresh
( Refresh )

Fig. 17

See Your Videos  
Soar On YouTube

<Welcome, User>  
Logout  
Account ( Import Video )

Dashboard | Channels | Videos | Groups | Alerts | Reports

Manage Alerts

My Alerts   Add Alert   Alert Prefs

| Alert Name | Status | Actions | Method | Last Fired | Created |
|---|---|---|---|---|---|
| View Alert 1 | Active | ⏸ ✏ ✕ | Email | 10/1/13 | 9/18/13 |
| View Alert 2 | Paused | ▶ ✏ ✕ | Text Msg | 10/1/13 | 9/18/13 |
| Subscriber loss- channel name | Active | ⏸ ✏ ✕ | Text Msg | 10/1/13 | 9/18/13 |
| Subscriber gain- channel name | Active | ⏸ ✏ ✕ | Notification | 10/1/13 | 9/18/13 |

Create Playlist

Enter set of keywords to best describe your playlist:

```
Enter keywords separate by commas
```

( Generate List )

Fig. 25

| Touchstorm Video index |

[Search] (Generate Report)

Select a theme, conversation or topic using the search box or browse below.

| Level 1 - Theme | Level 2 - Conversation | Level 3 - Topic |
|---|---|---|
| <Theme> | | |
| <Theme> | | |
| <Theme> | | |

Don't see what you are looking for? Recommend categories below to be added to the YouTube Genome Project. We will email you when they are complete.

[Suggest any category] [Email]                    (Send)

Fig. 27

| Touchstorm Video index |

Search | (Generate Report)

Select a theme, conversation or topic using the search box or column structure below.

| Level 1 - Theme | Level 2 - Conversation | Level 3 - Topic |
|---|---|---|
| <Theme> | <Conversation> | <Topic> |
| | <Conversation> | <Topic> |
| | | <Topic> |

Don't see what you are looking for? Recommend categories below to be added to the YouTube Genome Project. We will email you when they are complete.

Suggest any category | Email | (Send)

Fig. 28

Touchstorm Video index | Topic Overview

Topic Landscape: <Topic>
Unlock the Topic Report Sections

Enter email

- Keep me up to date about the latest system features and new reports.
- Keep me informed on this channel's progress. A monthly email will be sent with a link to this report with the most current data.

Unlock

Fig. 39

| Touchstorm Video index | Conclusion |

Channel Overview

View Count

The YouTube Channel <Channel> currently has 313,016,457 views

1 #6  #1 #8  #1 #948

41  #70  #144,969

<Channel> ranks 6 out of 41 in <Topic>.  <Channel> ranks 8 out of 70 in <Conversation>.  <Channel> ranks 948 out of all 144,969 in the System.

YouTube Subscribers

The YouTube Channel <Channel> currently has 387,845 subscribers

1 #12  #1 #20  #1 #2911

41  #70  #144,969

<Channel> ranks 12 out of 41 in <Topic>.  <Channel> ranks 20 out of 70 in <Conversation>.  <Channel> ranks 2,911 out of all 144,969 in the System.

Fig. 40

Big Picture Results: Share of YouTube Search (Organic)

| Brand | Page One Listings Baseline | Share of Search Baseline | Page One Listings Now | Share of Search Now | Change in Share of Search |
|---|---|---|---|---|---|
| Brand 01 | 257 | 2.4% | 844 | 7.8% | 228.40% |
| Brand 02 | 112 | 3.0% | 641 | 17.3% | 472.32% |
| Brand 03 | 102 | 2.4% | 258 | 5.9% | 152.95% |
| Brand 04 | 256 | 1.0 % | 489 | 1.9% | 91.02% |
| Brand 05 | 91 | 1.1% | 167 | 2.0% | 83.52% |
| Totals | x | x | x | x | x |

Fig. 42

Channel Description Module

Top Videos Module

Comparative Graphing Module -- doubles as vital stats module

Custom Charts

THEME -- <Theme>
CONVERSATION -- <Conversation>
        TOPIC -- <Topic>

ChannelURL ChannelName TViScore Views Subscribers

○
○    Data table from Ratings
○    a. Filterable data across top
○    b. Channels down left ( Try Another Category )

Choose Up to Six Channels to Chart using Radial Buttons ( Choose Date Range ) ( Choose Data Point ) ( Choose Chart Type ) ( Choose Time Increment )

Unique Visitors

Value

Dates

Fig. 51

| Category 1 | Search Vol. |
|---|---|
| Sub Cat. 1 | N |
| Sub Cat. 2 | N |
| Sub Cat. 3 | N |
| Sub Cat. 4 | N |
| Sub Cat. 5 | N |

| Category 2 | Search Vol. |
|---|---|
| Sub Cat. 1 | N |
| Sub Cat. 2 | N |
| Sub Cat. 3 | N |
| Sub Cat. 4 | N |
| Sub Cat. 5 | N |

| Category 3 | Search Vol. |
|---|---|
| Sub Cat. 1 | N |
| Sub Cat. 2 | N |
| Sub Cat. 3 | N |
| Sub Cat. 4 | N |
| Sub Cat. 5 | N |

| Category 4 | Search Vol. |
|---|---|
| Sub Cat. 1 | N |
| Sub Cat. 2 | N |
| Sub Cat. 3 | N |
| Sub Cat. 4 | N |
| Sub Cat. 5 | N |

Fig. 54

Touchstorm Video index

- Theme
- Theme
- Theme
- Tag
- Theme
- [...]

Set Mining Preferences

Selected "<Tag>"

( Add for mining )

Currently Mining:

Search: ☐

| # | Tag | Enable? | Actions |
|---|-----|---------|---------|
| ☐ | Tag 1 | ☐ | Get Keywords \| Add \| Reset |
| ☐ | Tag 2 | ☐ | Get Keywords \| Add \| Reset |
| ☐ | Tag 3 | ☐ | Get Keywords \| Add \| Reset |
| ☐ | Tag 4 | ☐ | Get Keywords \| Add \| Reset |
| ☐ | Tag 5 | ☐ | Get Keywords \| Add \| Reset |
| ☐ | Tag 6 | ☐ | Get Keywords \| Add \| Reset |
| ☐ | Tag 7 | ☐ | Get Keywords \| Add \| Reset |
| ☐ | Tag 8 | ☐ | Get Keywords \| Add \| Reset |
| ☐ | Tag 9 | ☐ | Get Keywords \| Add \| Reset |
| ☐ | Tag 10 | ☐ | Get Keywords \| Add \| Reset |
| ☐ | Tag 11 | ☐ | Get Keywords \| Add \| Reset |
| ☐ | Tag 12 | ☐ | Get Keywords \| Add \| Reset |
| ☐ | Tag 13 | ☐ | Get Keywords \| Add \| Reset |
| ☐ | Tag 14 | ☐ | Get Keywords \| Add \| Reset |

( Delete Selected ) ( Delete All )

Fig. 62

Touchstorm Video index

Search Keywords
Check to delete keyword

| Keyword | Results | Video Search |
|---|---|---|
| ☐ Tag 1 | 150 | ☐ |
| ☐ Tag 2 | 50 | ☐ |
| ☐ Tag 3 | 50 | ☐ |
| ☐ Tag 4 | 50 | ☐ |
| ☐ Tag 5 | 500 | ☐ |
| ☐ Tag 6 | 50 | ☐ |
| ☐ Tag 7 | 50 | ☐ |
| ☐ Tag 8 | 50 | ☐ |
| ☐ Tag 9 | 50 | ☐ |
| ☐ Tag 10 | 50 | ☐ |

( Save Changes )  ( Close )

Tag 14    Get Keywords | Add ( Delete Selected )  ( Delete All )

Fig. 63

| Touchstorm Video Index |
| --- |

Channels Collected From YouTube

- Theme
- Theme
- Theme
- Tag
- Theme
- [...]

<Theme><Conversation><Topic>

Search: [         ]

| # | Channel Name | Channel Title | Video Count | Views | Subs | Keyword Hits | Unique Videos | Unique Percentage | Actions |
|---|---|---|---|---|---|---|---|---|---|
| ☐ | Channel | Title | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | Title | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | | 1 | 10,000 | 10 | 2 | 2 | N% | Approve \| Delete |
| ☐ | Channel | | 1 | 10,000 | 10 | 2 | 2 | N% | Approve \| Delete |

( Add Selected )   ( Dismiss Selected )

Fig. 64

VIDEO CONTENT OPTIMIZATION SYSTEM AND METHOD FOR CONTENT AND ADVERTISEMENT PLACEMENT IMPROVEMENT ON A THIRD PARTY MEDIA CONTENT PLATFORM

CROSS-REFERENCE TO RELATED APPLICATION

The instant application claims priority to Provisional Patent Application Ser. No. 61/980,812, filed Apr. 17, 2014, and all disclosure of the priority application is incorporated at least by reference.

BACKGROUND OF THE INVENTION

1. Field of the Invention

The present invention is in the technical field of Internet-provided software services, and pertains more particularly to a system enabling persons who post content in various on-line venues to track, analyze, manage, optimize and predict performance of their posted content and to compare their posted content to content posted by others in a more granular and insightful manner than provided by the services that make the posted content available to the public.

2. Description of Related Art

People post content in on-line venues for a wide variety of purposes. Some postings are for entertainment, some are for education, some are to promote an idea, a philosophy, or a political position, and a great many are by for-profit businesses to promote salable goods and services. Means for gauging effect of posting content is closely related to the nature of the poster and the posting. In the case of political promotion, polling and election results may tell the tale. In the case of religion, new converts may indicate the effect of posted content. In the case of a video blogger (vlogger), viewing of the actual content is a primary measure. In the case of for-profit enterprises one way to gauge the effect of content posted for promotional purposes is to track sales statistics. If a business promotion is producing desired results, then sales of the promoted goods or services should increase, and revenue should also increase. But this conventional gauge is a macroscopic approach, and suffers from many problematic issues. Emergence of large online platforms that enable posting of content such as Facebook™ and YouTube™ for example, frequently command high user activity, and therefore have attracted marketers who now incorporate such platforms into their marketing strategies and execution plans.

With a continuing accelerated growth of such platforms there is a growing need to understand data from such platforms. These content platforms have also become an increasingly competitive environment and thus, creating the need for tools that enable a competitive advantage. As the volume of data and the level of competition continue to increase, individuals and businesses alike seek new and novel ways to track, analyze, and compare data to discover new ways to compete. There is also a need for tools that enable optimization of content, scalability with managing large volumes of content and data and predictability of future content performance.

Many platforms, YouTube™ being one example, that facilitate content postings and consumption typically enable persons and brands who use the system to see only select analytical results that apply to his or her individual channel. These platforms do make basic data available through an API. However, this is very basic data that does not allow adequate competitive comparisons nor does it necessarily help the content owner to compete, nor does it help the content owner become efficient with time. This restrictive view compromises the quality of any analysis or response actions.

Additionally, since these online platforms attract a significant number of viewers, advertisers, other than the persons who post the content, see these sites as having critical mass and may wish to place advertisements around the content as a promotional tactic. Given the vast range of content and highly variable quality that may be evident in such sites, advertisers need a method with which to identify and target high quality content channels that would be relevant for the placement of advertisements. What is clearly needed is a third-party service that can import data from Internet sites that enable posting of content, like videos, music, and other image-based, text-based or audio-based material, and can enrich that data, add to the data, and manipulate the data to create a more robust depiction. What is also needed are sophisticated tools for analyzing such data to determine the effectiveness of and opportunities with the posted content in accomplishing the purposes intended, and the ability to make changes to the promotional material in response to the enriched data.

BRIEF SUMMARY OF THE INVENTION

In one embodiment of the invention a system is provided, comprising a network-connected service platform comprising a computerized server, a physical computer processor operating in the computerized server, executing coded instructions from a non-transitory physical medium, a data repository coupled to the network-connected server, a programmable interface operable in the service platform, enabled for two-way communication with a content platform, enabling the service platform to access and retrieve data from the content platform, and classification data and profile data stored in the data repository. The service platform, executing the coded instructions, retrieves data associated with specific content from the content platform, integrates the retrieved data with the classification data and profile data in the data repository, creating an enhanced data set, and provides interactive interfaces to computerized appliances connecting through the network, enabling users of the computerized appliances to access, analyze and manipulate the enhanced data set, results of user analysis and manipulation providing improved understanding of characteristics of the specific content.

In one embodiment of the system the service platform additionally retrieves data associated with specific content from sources other than the content platform and integrates that data also into the enhanced data set. Also in one embodiment users are enabled, through one or more interactive interfaces provided by the coded instructions, to specify content for data retrieval. Also in one embodiment the classification data and the profile data comprise a taxonomy describing a plurality of categories characterizing the specific content, and wherein the users are enabled through one or more of the interactive interfaces provided by the coded instructions to associate selected content with categories in the taxonomy.

In one embodiment specifically-authorized users are enabled, through one or more interactive interfaces provided by the coded instructions, to change structure of the taxonomy by adding, deleting and combining categories. Also in one embodiment the users are enabled to associate keywords with specific content, and to post the keywords to the content platform to be associated with the specific content in the content platform. Also in one embodiment the users are enabled to identify specific content for tracking, and to enter data-change conditions for alerts, and wherein the system, through execution of the coded instructions, sends alerts to users as conditions are met.

In one embodiment of the system the users are enabled to configure processes for analysis of data associated with individual content and to create reports ranking the individual content according to individual ones of categories in the taxonomy, and ranking individual content in contrast to other content. Also in one embodiment data limited to one or more categories in the taxonomy is retrieved from a platform other than the content platform, and analyzed with the enhanced data set in the data repository, to determine characteristics of content in the content platform. And in one embodiment the content platform is a video presentation platform wherein users post videos in channels to promote products and services.

In another aspect of the invention a method is provided, comprising retrieving through a programmable interface operated by a service platform provided by a network-connected computerized server having a physical processor executing coded instructions from a non-transitory medium, data associated with specific content from a content platform, integrating the retrieved data with classification and profile data stored in a data repository coupled to the server, creating an enhanced data set, providing by execution of the coded instructions, interactive interfaces to computerized appliances connecting through the network, enabling users of the computerized appliances to access, analyze and manipulate the enhanced data set, results of user analysis and manipulation providing improved understanding of characteristics of the specific content.

In one embodiment of the method the service platform additionally retrieves data associated with specific content from sources other than the content platform and integrates that data also with the enhanced data set. Also in one embodiment the users are enabled, through one or more interactive interfaces provided by the coded instructions, to specify content for data retrieval. Also in one embodiment the classification data and the profile data comprise a taxonomy describing a plurality of categories characterizing the specific content, and wherein the users are enabled through one or more of the interactive interfaces provided by the coded instructions to associate selected content with categories in the taxonomy. In one embodiment specifically-authorized users are enabled, through one or more interactive interfaces provided by the coded instructions, to change structure of the taxonomy by adding, deleting and combining categories.

In one embodiment of the method the users are enabled to associate keywords with specific content, and to post the keywords to the content platform to be associated with the specific content in the content platform. Also in one embodiment the users are enabled to identify specific content for tracking, and to enter data-change conditions for alerts, and wherein the system, through execution of the coded instructions, sends alerts to users as conditions are met.

In one embodiment the users are enabled to configure processes for analysis of data associated with individual content and to create reports ranking the individual content according to individual ones of categories in the taxonomy, and ranking individual content in contrast to other content. Also in one embodiment data limited to one or more categories in the taxonomy is retrieved from a platform other than the content platform, and analyzed with the enhanced data set in the data repository, to determine characteristics of content in the content platform. And in one embodiment the content platform is a video presentation platform wherein users post videos in channels to promote products and services.

BRIEF DESCRIPTION OF THE DRAWINGS

FIG. 3 shows an example screenshot of a graphical user interface illustrating a log in page for users to access the system.

FIG. 5 shows an exemplary screenshot of a graphical user interface depicting a channel classification tool.

FIG. 6 shows a portion of a marketing taxonomy used to classify channels.

FIG. 17 shows an exemplary screenshot of a graphical user interface depicting a channel wide search ranking by keywords report.

FIG. 19 shows an exemplary screenshot of a graphical user interface depicting an alerts tool.

Figure 24:
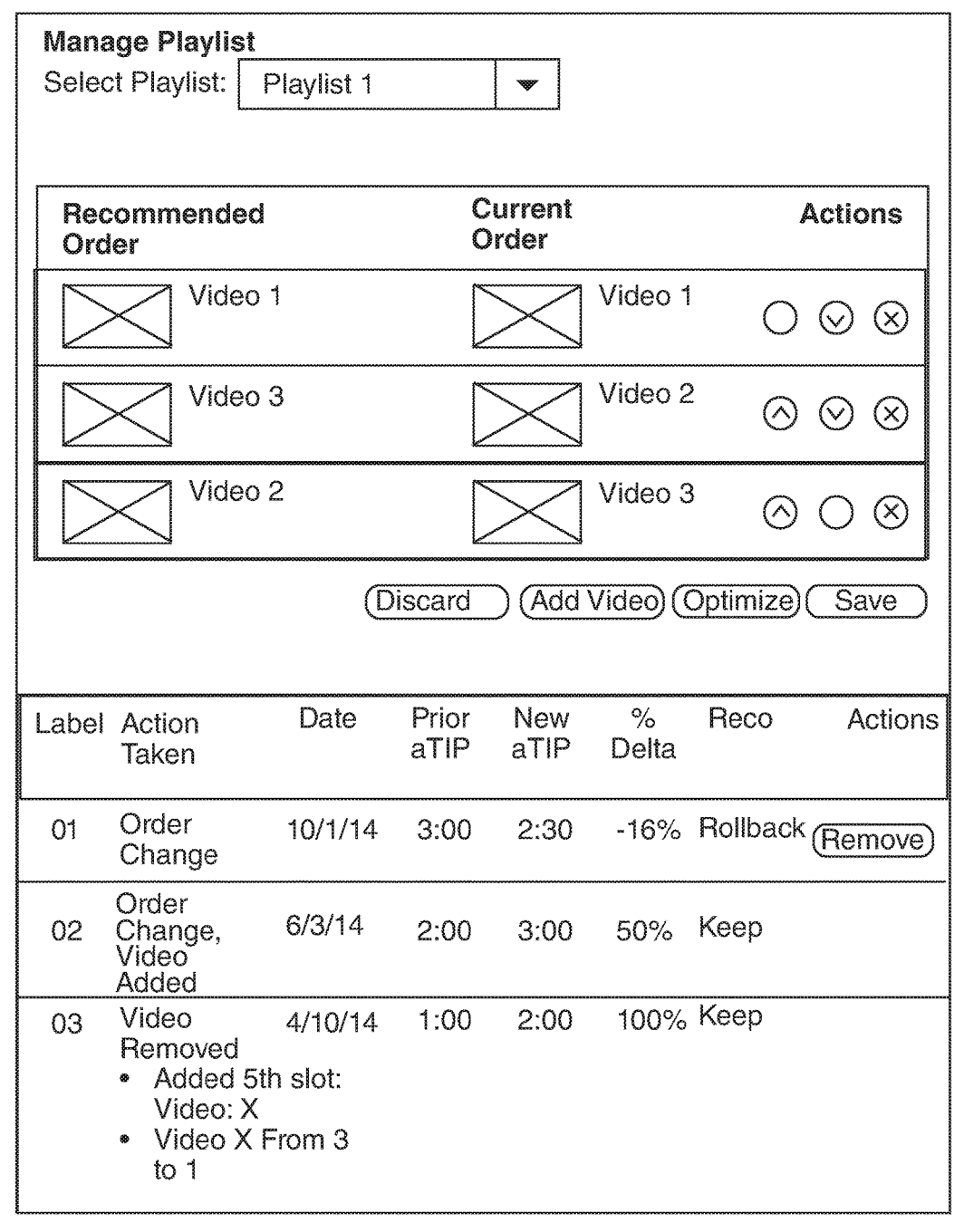

FIGS. 22 through 26 depict interfaces used in a playlist generator in an embodiment of the invention.

FIGS. 27 through 30 depict interfaces used in ratings in an embodiment of the invention.

FIGS. 31 through 41 depict interfaces used in channel reporting in an embodiment of the invention.

FIG. 42 depicts an interface used in a share-of-search function in an embodiment of the invention.

FIGS. 43 through 52 depict interfaces provided in directory/profile functionality in an embodiment of the invention.

FIGS. 53 through 60 depict interfaces used in a topic finder function in an embodiment of the invention.

FIGS. 61 through 64 depict interfaces used in channel mining functionality in an embodiment of the invention.

DETAILED DESCRIPTION OF THE INVENTION

Figure 1:
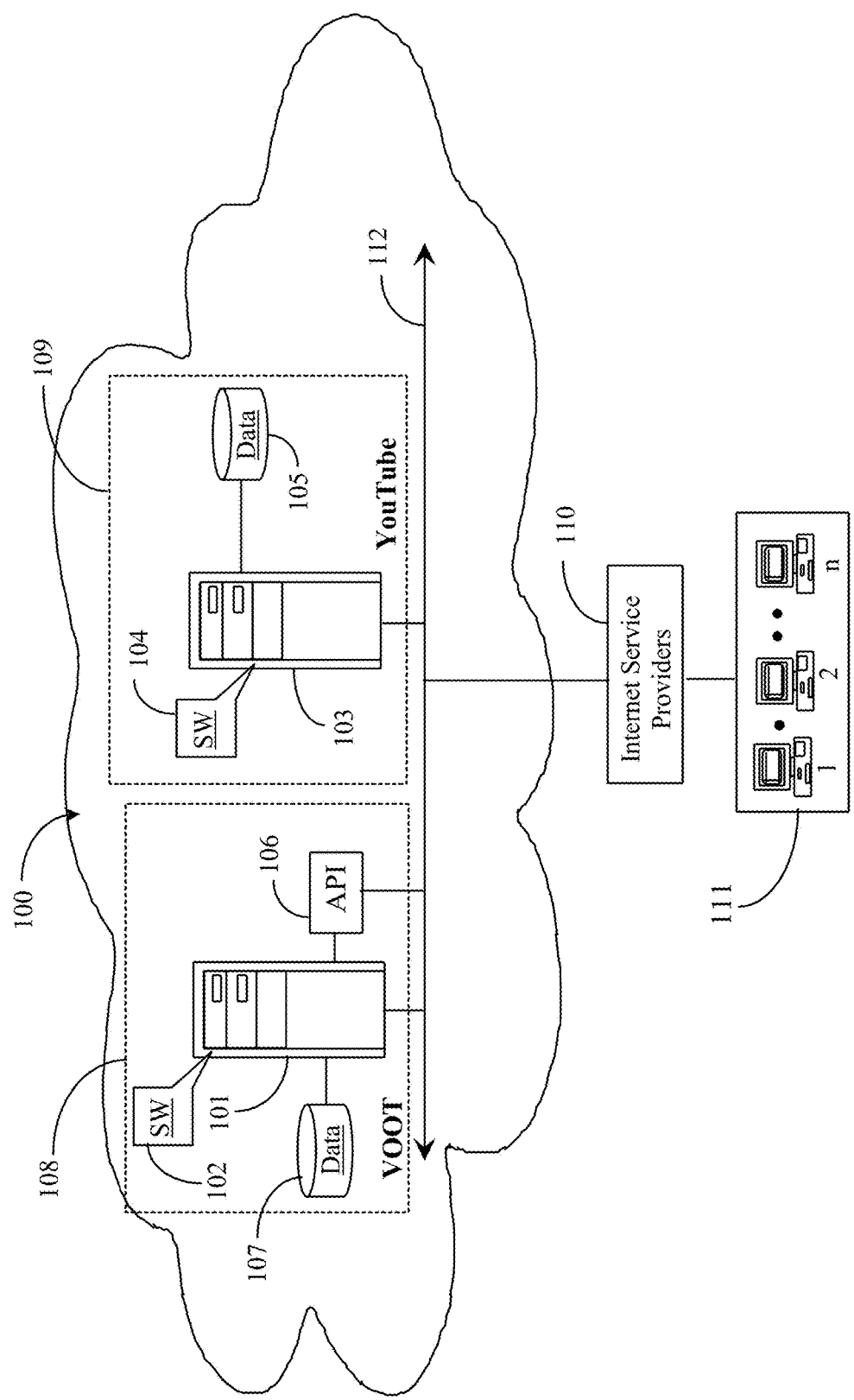
FIG. 1 is a high-level architectural diagram illustrating system components and interconnection in an embodiment of the present invention.

Emergence of online platforms that command high user activity has attracted marketers who now incorporate such platforms into their marketing strategies and execution plans, increasing a need to understand data from the online platforms. As data volume continues to increase, individuals and businesses are seeking additional ways to process, analyze and apply the data. In description of embodiments of the present invention below, the online platform YouTube™ is used in an exemplary manner to describe the invention in various aspects. The invention is in no way limited by application of YouTube™, and the invention may be practiced with a variety of other online platforms and the like.

YouTube™ enables video producers to display their video content, and this content receives significant user engagement from the public. YouTube™ is currently the largest online video viewing site and the second largest search engine in the world. At the time of this patent application YouTube™ has more than 1 billion visitors each month and over 6 billion hours of YouTube™ videos are watched each month, which translates roughly to about an hour for every person on Earth. The video content hosted on YouTube™ covers thousands of topics. According to Nielsen, YouTube™ reaches more US adults ages 18-34 than any cable network.

YouTube™ primarily comprises video content. A video content owner or creator who wishes to display videos on YouTube™ sets up a YouTube™ account to enable their videos to be viewed. Each YouTube™ account is given a channel, which the content owner manages for the content they post.

Viewers of YouTube™ content can interact with the content in a variety of ways such as, but not limited to: (1) viewing the content (2) indicating if they like or dislike a video, (3) flagging a video as a favorite, (4) sharing a video in more than 12 ways, and (5) adding comments about the video in a dedicated comment section. A video viewer can also subscribe to a channel and receive notifications on new content uploaded to that channel. All of these user actions generate data, which is stored by YouTube™ specific to the videos, channels and owners of the channels.

Based on the above, there is an unmet need for a robust analytical system to enable content owners to track and trend crucial video and channel performance and engagement data such as but not limited to search ranking data by keyword, share of search, video velocity, and various combinations of key data tracked by the system to reveal information that does not exist otherwise in the market, with such data exportable from the system via a variety of methods and formats.

YouTube™ is a vast system with myriad channels and videos, and there exists in YouTube™ a relatively crude system for rating videos, such as number of likes, favorites, and association of followers of channels. This statistical data may be retrieved from YouTube™ by such as an Application Program Interface (API). But there is no sophisticated, granular score-based system by which channels and individual videos may be categorized and performance rated in a variety of different contexts. One object of the present invention is just such a granular, score-based rating system.

In addition to the above, content owners need to be able to identify competitive channels and potential partner channels in many niche categories, to understand profiles and performance measures of channels highly performing in those categories, and to compare their own channels to other channels that are competing for the same users, within distinct marketing categories that do not exist on YouTube™ or otherwise in the marketplace. This too is an important object of the present invention.

Further still, content owners need predictive indicators that showcase potential future performance based on historical performance, when in comparison to others with or without the segmentation relative to these particular categories in order to optimize performance of the content owner's videos on YouTube™. Content owners need methods to impact their channels using tools that enable scalability with content management and optimization. And, advertisers who chose to place advertisements on the system need a way to identify quality content channels in certain marketing segments for placement of advertisements. This is an important object of the invention. With highly organized and detailed categorization of YouTube™ channels independently developed by the system, a channel owner can gain significant visibility of how they are performing within a category in which they are associated. The user may study category leaders and category trends, and discover holes on which they may capitalize in order to grow.

The present invention in one embodiment generally comprises a communication system including an application executing on a server, which server communicates with a database. The communication system in this embodiment is integrated with a data transfer system comprising a server that fetches data from YouTube™ or other content platform by an (API), and then updates the system's database with the newly fetched data. In some embodiments, described more fully below, data is not only fetched from the content platform, YouTube™ in examples used herein, but is also blended with other data residing in the system such as categorization and profile data. Data may be added back to YouTube™ channels by the system automatically in some circumstances. In some embodiments of the invention users may, by tracking, develop a robust data picture regarding their channels in YouTube™, the data picture derived from the blend of YouTube™ data and the categorization and profile data independently developed by the system.

The web-based application is accessed in one embodiment via the Internet at a website. The website allows users to access the system with the advantages of a graphical user interface, and in one embodiment the interface comprises a dashboard where users have access to analytical data and tools. The dashboard in this embodiment also includes a link to user account information and settings.

FIG. 1 is a high-level architectural diagram depicting organization of elements in an embodiment of the invention. In this diagram services are provided to subscribers in embodiments of the invention by software (SW) 102 executing on one or more servers 101 connected to Internet Backbone 112 in Internet network 100. These services are provided to individual subscribing users 111 (1 through n)

connecting to Internet 100 by any known means and through any combination of Internet Service Providers 110.

It is to be noted that server 101 may be one server or may represent a plurality of servers, either at one geographic location or in separate locations, and that SW 102 may be a software suite executing on one or more of the servers to provide the many functions and services that are described in enabling detail below.

YouTube™ service 109 is represented in FIG. 1 as provided by software 104 executing on a server 103 coupled to a data repository 105. It should be noted that, as in the case of the services of the invention, the YouTube™ operations may be provided by an extensive software presence executing on a plurality of servers that may be grouped or distributed. The depiction in FIG. 1 is representative and exemplary. Further, the use of YouTube™ in this figure and description is exemplary of a great many venues to which the system of the invention may connect, and from which data may be collected and processed for benefit of users 111.

In embodiments of the invention system 108 connects to YouTube™ 109 through an Application Program Interface (API) 106 to receive data regarding specific channels in YouTube™. Users 111 in applications of the invention may be registered to YouTube™ and may be assigned Channels where they post video material, often promotional, which may be found through search by other users, and may be played by those users.

A person or enterprise owning one or more channels in YouTube™ is enabled by YouTube™ to view the data generated by viewers, and to use that data to evaluate their own efficacy toward their goals. In most cases accomplishment of business goals is best measured by sales and revenue generation; YouTube™ does not and cannot measure these financial effects. It may be in some circumstances that video presented by a particular person or enterprise may generate a strong reaction on the part of viewers of those videos, but sales and revenue may actually suffer as a result.

Beyond the specific data collected and made available by YouTube™ there is an unmet need for a more robust analytical system to enable content owners to track and trend crucial video performance and engagement data such as keyword search ranking data, calculated measures such as subscribers per million views, video velocity, video and channel likability as well as predictive indicators that showcase potential future performance based on historical performance relative to a particular category of consumer interest in order to optimize performance of the user's videos on YouTube™. There is also an unmet need to view these massive data sets through a lens that provides segmentation into smaller groups based at least in part on marketing categories, and to be able to isolate small increments of this data for micro-comparisons. This is an area of the services of the present invention, and a starting point in one aspect is the data collected through API 106 of FIG. 1, which in some embodiments may be a RESTful API, which communicates on one side with server 101 and with a database which may be a part of data repository 107. On the other side API 106 fetches data from YouTube™ 109. The RESTful API server 106 in one embodiment conforms to Representational State Transfer (REST) constraints, utilizing a set of operations that use HTTP methods, such as GET, POST, PUT, and DELETE. HTTP request calls to the server in this implementation are controlled by a handler that checks a memory cache for the requested data. If the data is not found in the cache, then a query is issued to the database and returns a record set. Both cached and database record sets are then formatted in one embodiment into a JavaScript Object Notation (JSON) response and sent back to the caller to finish the interaction. The cache is updated daily through an internal process. This process ensures that new data is cached for faster responses to calls.

Users interact primarily through a web-based application provided as part of SW 102, which is described further below in enabling detail. It may be seen in FIG. 1 that users 111 may connect and interact with YouTube™ 109 and system 108 as well. In a very broad sense, in some use cases of the invention, a user 111 may be a business interest owning channels in YouTube™ and monitoring YouTube™ data, and may also access services through system 108 regarding the same channels and videos.

In the description above users 111 are described as persons or enterprises who post content to YouTube™ or whatever content platform may be an object of the invention in different embodiments, but there is one important case wherein users 111 may not be the content posters and owners. The system of the invention also provides tools and services to advertisers, who may wish to track efficacy and effect of content, such as videos, in a venue like YouTube™ for the purpose of choosing content to which they might wish to associate an advertisement. This class of users of the system of the invention, the tools made available, and the architecture and methods are described in more enabling detail below.

In a very broad sense the system of the invention extracts through API 106 all of the YouTube™ data for channels and specific videos specified by the subscribers, and blends this data with additional data determined and created by the system for the same channels and video by certain monitoring, research and experimental procedures proprietary to the system. The blended data is then used as a basis in a variety of analytical and presentation procedures to provide a very much enhanced process for the users to track performance of their promotional efforts, view and analyze video performance in a variety of system-provided segments for the entire online content platform, in this case YouTube™, and to predict performance based on suggested changes in their promotional efforts. One of the ways this is done in embodiments of the invention is through very granular categorization of the nature and characteristics of the content posted on the venue, which may be an immediate object of the service of the invention.

Stated perhaps a bit differently, in an embodiment of the invention the system provided by the architecture depicted in FIG. 1 comprises a network-connected service platform having a computerized server, a physical computer processor operating in the computerized server, executing coded instructions from a non-transitory physical medium, a data repository coupled to the network-connected server, a programmable interface operable in the service platform, enabled for two-way communication with a content platform, enabling the service platform to access and retrieve data from the content platform, and classification data and profile data stored in the data repository.

The service platform, executing the coded instructions, retrieves data associated with specific content from the content platform, integrates the retrieved data with the classification data and profile data in the data repository, creating an enhanced data set, and provides interactive interfaces to computerized appliances connecting through the network, enabling users of the computerized appliances to access, analyze and manipulate the enhanced data set, results of user analysis and manipulation providing improved understanding of characteristics of the specific content.

In this description by "content platform" is meant any network-connected platform, of which YouTube™ is one example, where content, including but not limited to videos, blogs, other text instances, audio files, and essentially any other form of content may be displayed or played. Websites may be considered as content platforms in this context, as may social media sites. Content for purposes of this specification may be any form of media, and the skilled person will understand that content is not typically seamless, but usually stored and displayed in specific instances, such as individual videos or audio files.

In a content platform, data that may be retrieved refers of course to the specific content, like videos of channels presenting a plurality of videos. Data that may be retrieved, however, is not limited to the specific content, but may be data about the specific content, such as comments made by viewers of the specific content, Likes, Dislikes, ratings, number of views related to time, and the like.

According to one embodiment of the invention a system and method for YouTube™ video performance analytics and management is provided. The system and method of the invention in this embodiment enables users to access the system via the Internet using a graphical user interface, which is described below in enabling detail.

Figure 2:
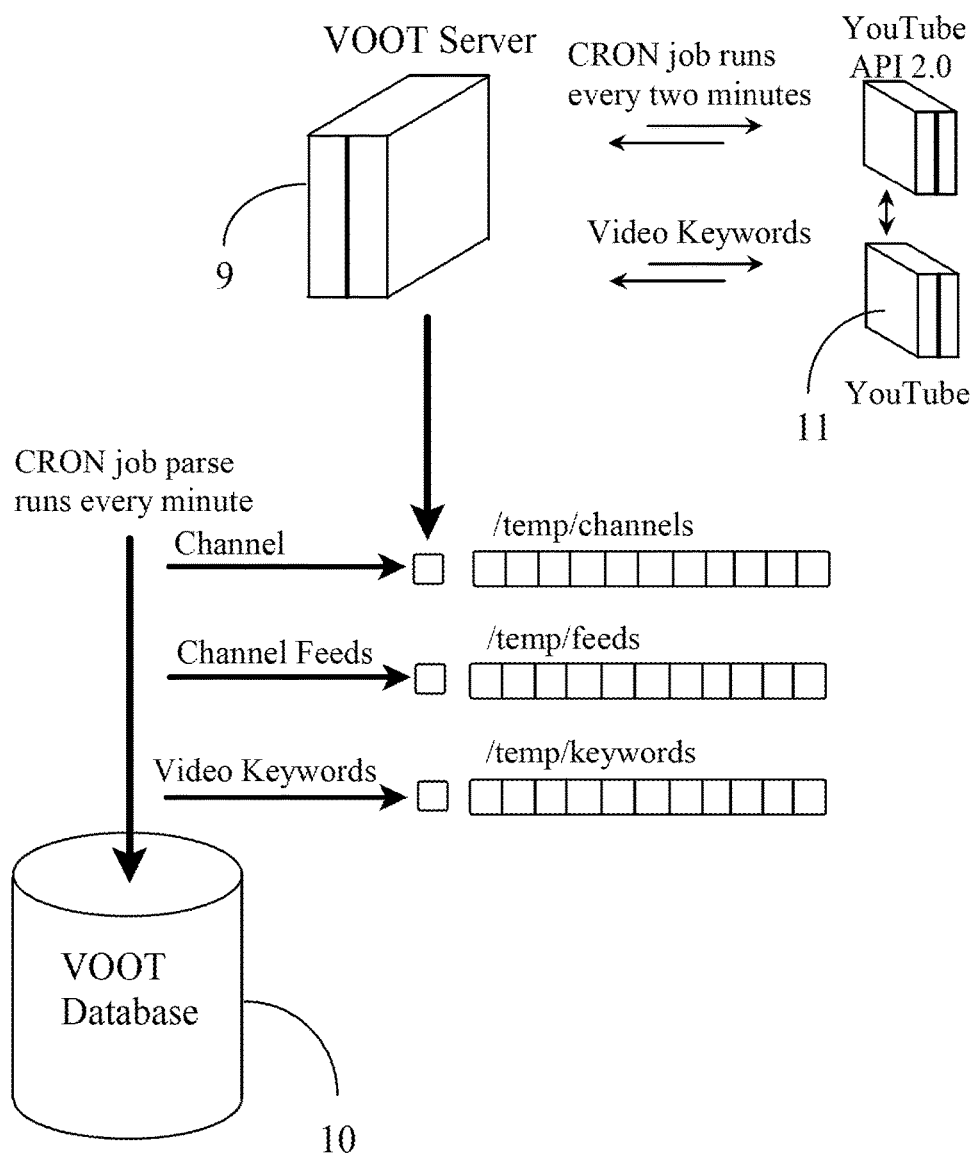
FIG. 2 shows a flowchart that illustrates a data transfer system according to one embodiment of the present invention.

FIG. 2 illustrates a data transfer and aggregation system 200 according to one embodiment of the invention. Data transfer system 200 includes server 9 that fetches data from API 11, analogous to API 106 in FIG. 1, which then updates the database 10 with the newly fetched data. API 11 allows developers access to video statistics and channel data. More specifically, server 9 fetches data from YouTube™ API 11, including but not limited to channel, channel feeds, video keywords, and video comments. The channel and channel feeds (video data) are requested in one embodiment in JavaScript Object Notation (JSON) files, and the video keywords are captured in Hypertext Markup Language (HTML) files. These files are temporarily saved on server 9 and are ready to be parsed. Next, the files are opened and the data is extracted and transferred to database 10 in an appropriate format.

Login

Referring again to FIG. 1, SW 102 in one embodiment provides interfacing services for persons who access the system of the invention via the Internet at a website provided by server 101. The website allows users to access the system with the advantages of a graphical user interface. For example, FIG. 3 shows an exemplary screenshot of a graphical user interface illustrating a log-in page.

Import

Figure 4:
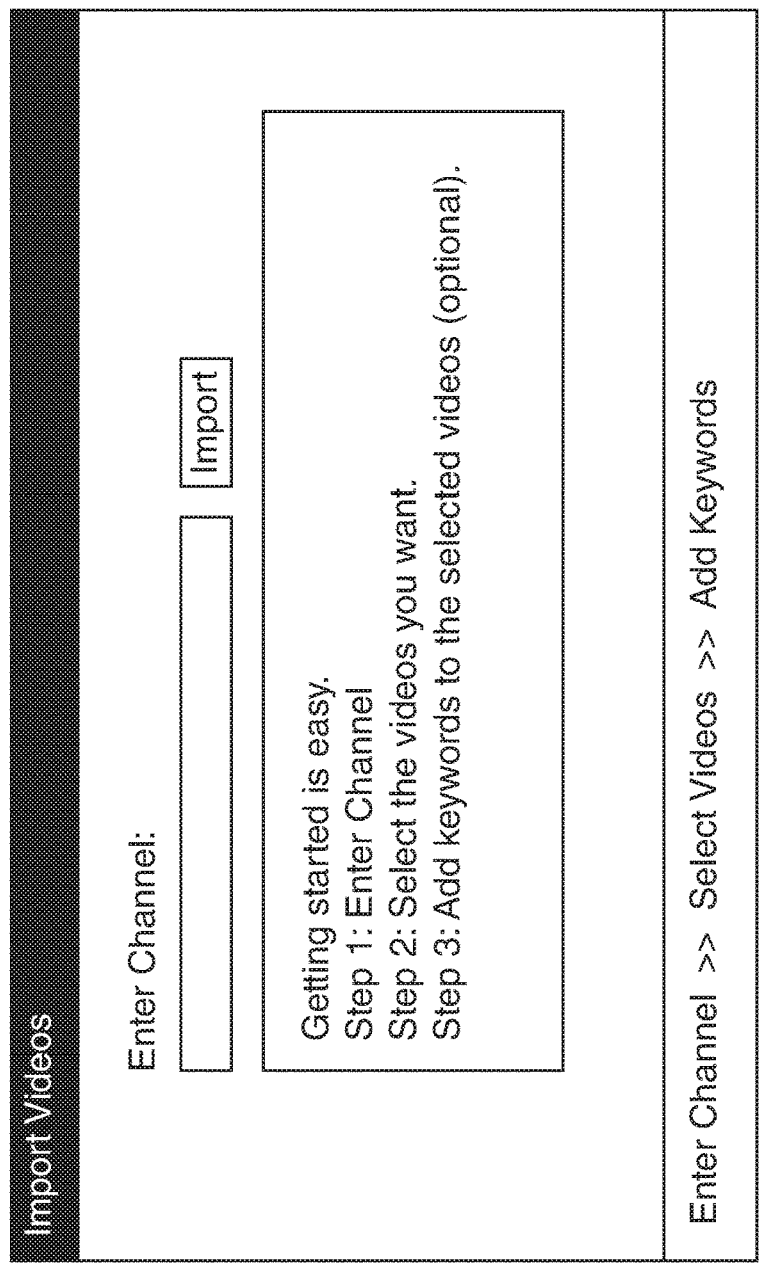
FIG. 4 shows an example screenshot of a graphical user interface illustrating an import tool.

FIG. 4 is an exemplary screenshot illustrating an import tool where users may directly import video data to be analyzed from YouTube™ API 11. A user in one embodiment simply enters a URL for a specific YouTube™ channel and activates the import button, whereby the system imports the video data from YouTube™ for the selected channel.

Profiling/Classifying

FIG. 5 is an exemplary screenshot illustrating a channel classification and profiling tool. In this embodiment channels are classified into a novel marketing taxonomy known to the inventors comprising primary segments, sub-segments, sub-sub-segments with further segments applied as is warranted by the specific marketing category. In different embodiments the hierarchy of the taxonomy may vary considerably. Additionally, channels may be further profiled by producer types, primary language, secondary language, production country, country/region targeted, targeted demographic, alternate channel name, channel as a reviewer, corporate owner, talent gender, talent race, offline marketing area, and in other ways as well.

The system in this embodiment determines if the channel has been previously entered into the database and renders either a prompt for the user to newly classify and profile the channel or overwrite the existing channel classification and profile. If the channel has been previously claimed via an authenticated user, with authentication described more fully below, further changes to the classification and profile data will be unavailable to public users of the system who are not authenticated to the channel. This channel-specific classification and profile data made available by the system and the channel and video-specific performance data obtained from YouTube™ are aggregated, creating a unique channel profile data set. This data set may be further expanded by adding in data from other third party entities.

Taxonomy

FIG. 6 is a partial listing of a marketing taxonomy. It may be seen in FIG. 6 that there are top-level categories, each of which lists associated second-level categories. For example, Health and Medical as a category has sub-categories of Women's Health, Addiction and Rehabilitation, Diabetes, and more. Each of the top-level categories has sub-categories. In some embodiments there are more levels of sub categories, and many more categories may be listed and managed. The list of FIG. 6 is exemplary.

It is important to note that the marketing taxonomy illustrated in an exemplary way by FIG. 6 is not limited in use to categorizing content from content posting platforms like YouTube™. In one exemplary use case the taxonomy is applied to search data returned by search engines, such as Google™, Yahoo™, and Bing™ revealing a hierarchical organization of raw search terms and their associated search volume at a distinct point in time. Importantly, YouTube™ data and data from other content platforms including search engines, where the search results are regarded as content in this context, may be classified using the same taxonomy and can therefore enable comparisons and other actions between the data from the different platforms within distinct segments of the taxonomy. The broad applicability of the dynamic taxonomy provides opportunity for clients of the system of the invention to further identify, compare, analyze, predict and ultimately compete. For example, where there is search demand (high volume of searches in a particular category) and low volume of video content on YouTube™ or in another posting platform of interest, then a user of the system may be guided for what forms, according to the taxonomy, of content to create and post. The taxonomy and this framework is set up around online platforms where content is posted, data generated whereby the data is classified into the taxonomy to reveal new, important information and enable new actions to be performed.

Channel Authentication

Figure 7:
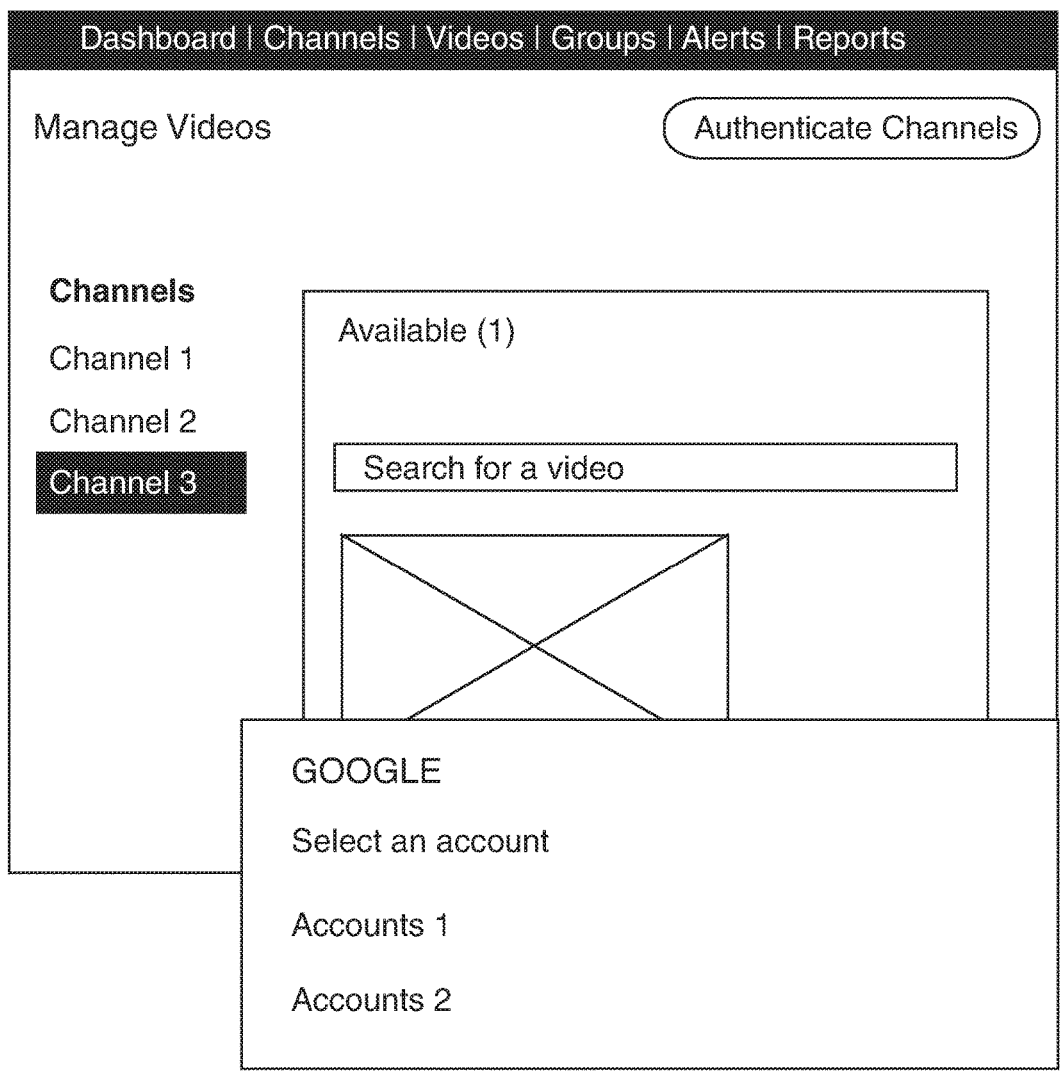
FIG. 7 shows an example screenshot of a graphical user interface illustrating an authenticate channel tool.

FIG. 7 is an exemplary screenshot illustrating a channel authentication tool. Users may select to sign in with Google using the authenticate channel button and progress through an interface into Google's OAuth in one embodiment, wherein they may log into their YouTube™ channel through the system. This action authenticates the user's credentials for managing a YouTube™ channel and differentiates the user in the system's database as the true channel owner. Channel owners can claim their channels in the system and can determine and lock the additional, system-supplied classification data that supplements data coming from YouTube™. The skilled person will recognize that the log-in and authentication described is but one of many ways that such may be done, and is only exemplary.

KW Search V1

Figure 8:
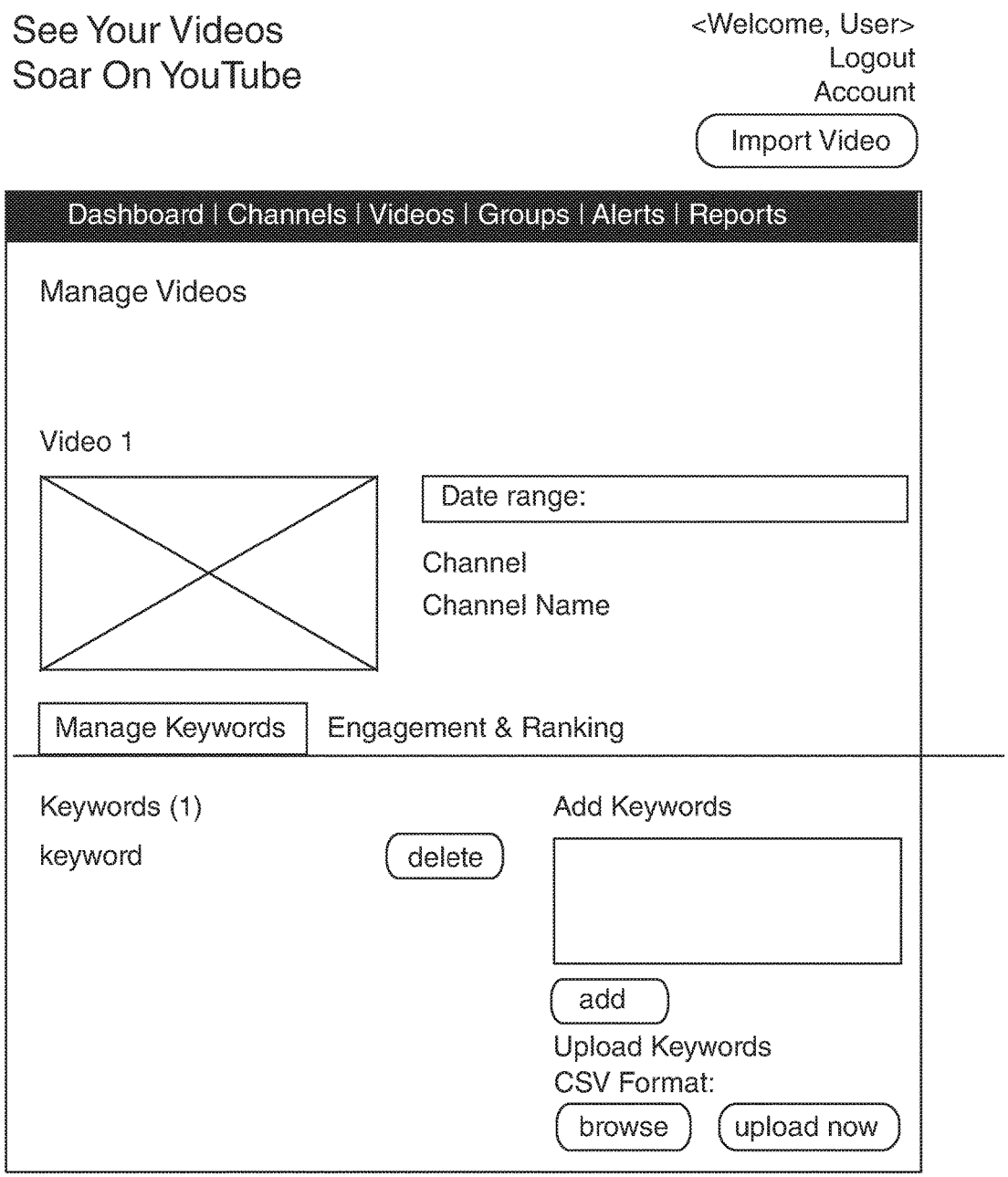
FIG. 8 shows an example screenshot of a graphical user interface illustrating a keyword tool.

FIG. 8 is an exemplary screenshot illustrating a keyword search monitoring tool. Using the keyword search monitoring tool the user has an ability to associate specific keywords to any video, channel or playlist tracked by the system. The user can either enter keywords directly into an input filed or upload a comma-separated-values (CSV) file containing keyword data. If no keywords are entered at this time, the user has an ability to add keyword information later using the videos link from the main navigation seen in FIG. 8. Users can also remove keyword information for a selected video, channel or playlist.

Manage Content

Figure 9:
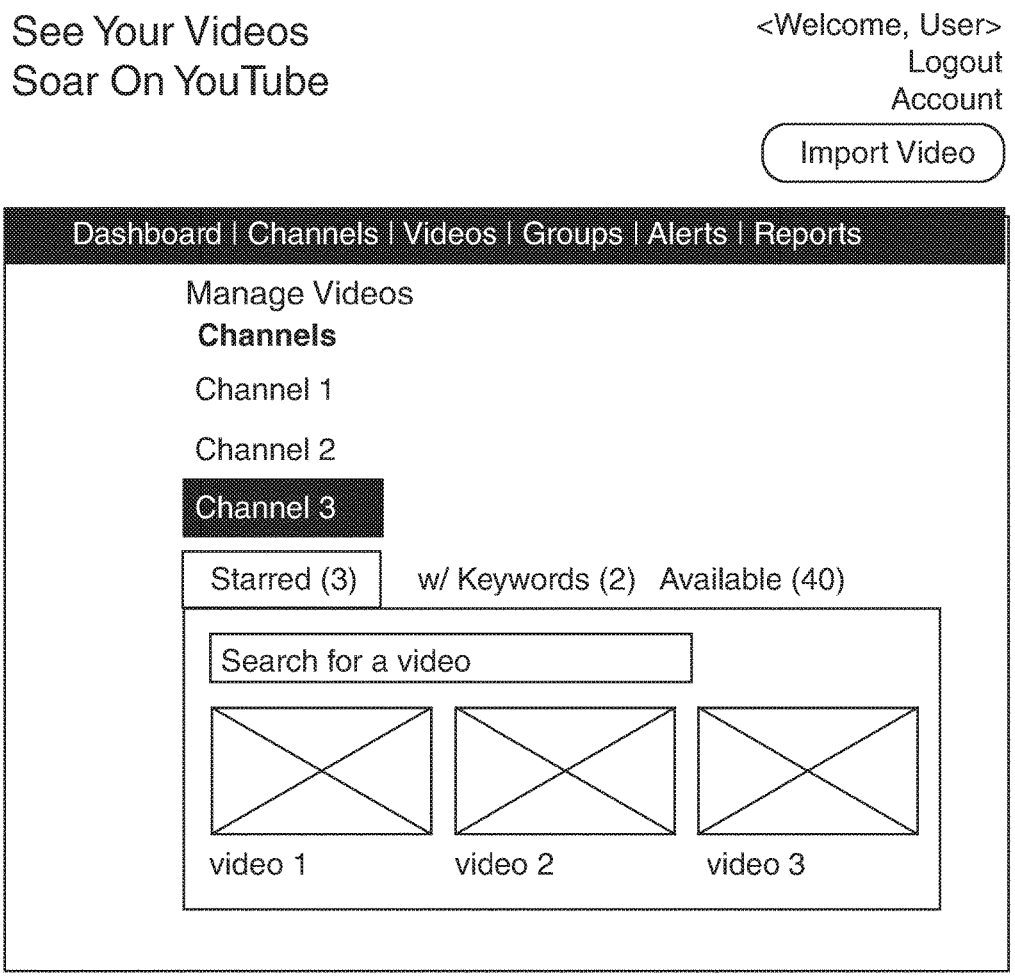
FIG. 9 shows an example screenshot of a graphical user interface illustrating a manage video tool.

FIG. 9 is an exemplary screenshot illustrating a Manage Videos tool. Here the user has a listing of the channels they have imported or otherwise associated with their system user account and the videos associated with each channel. Once the user selects a channel, the user has an option to delete the channel or choose a specific video in the selected channel. Within the Manage Videos tool users can indicate which videos they would like to track by clicking, in this example, on the star displayed in the upper left hand corner of each video image. Once selected, these videos are displayed under a starred tab. Users can also see the videos in which they've associated keywords via the w/keywords tab. All videos associated with a channel that are not selected for tracking are shown by the available tab. Users can deselect and reselect videos for tracking within a channel. This function applies to any type of content tracked in the system with content associated with any content platform tracked by the system.

Manage Groups

Figure 10:
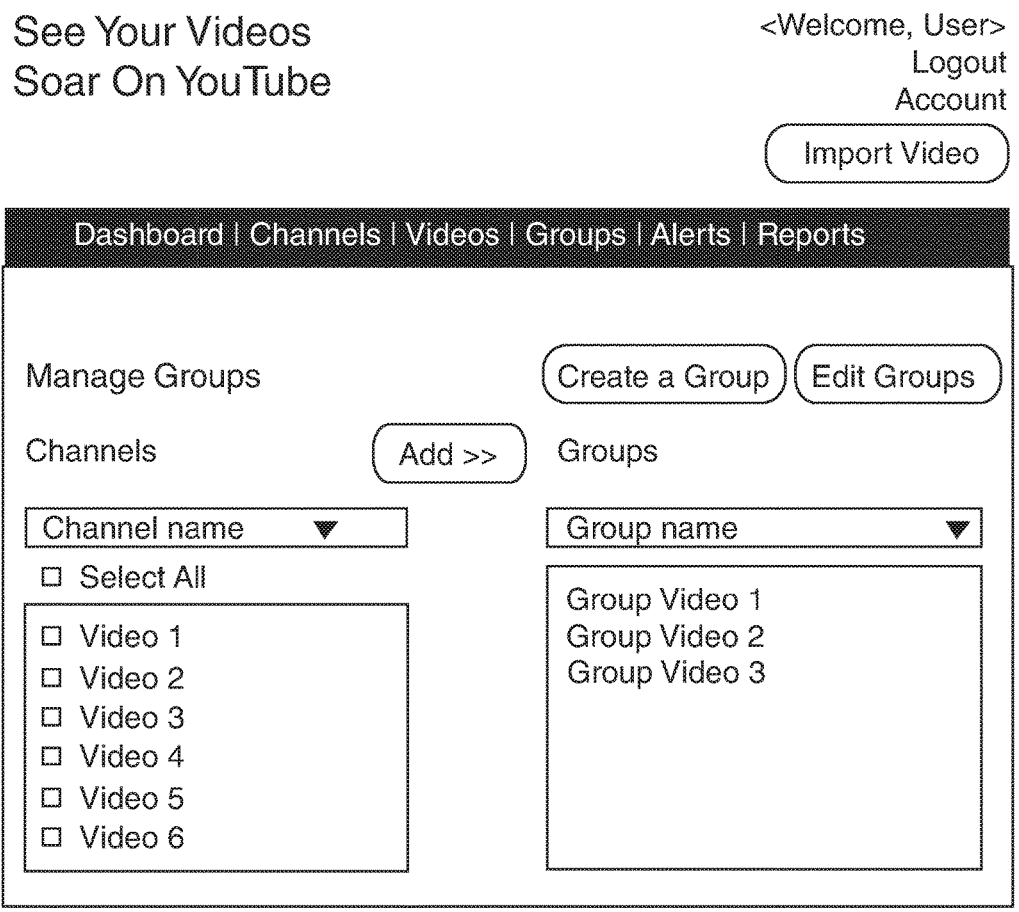
FIG. 10 shows an example screenshot of a graphical user interface illustrating a manage groups tool.

FIG. 10 is an exemplary screenshot illustrating a Manage Groups tool. Here the user has an ability to organize videos from more than one channel into a grouping. Users first set up a group name via the Create a Group button, after which the group displays on the right side of the page. Users then navigate through channels or content associated with their user account and select videos and/or channels to be included in a group. This function applies to any type of content tracked in the system with content associated with any content platform tracked by the system.

Channel Rank Report-Current View

Figure 11:
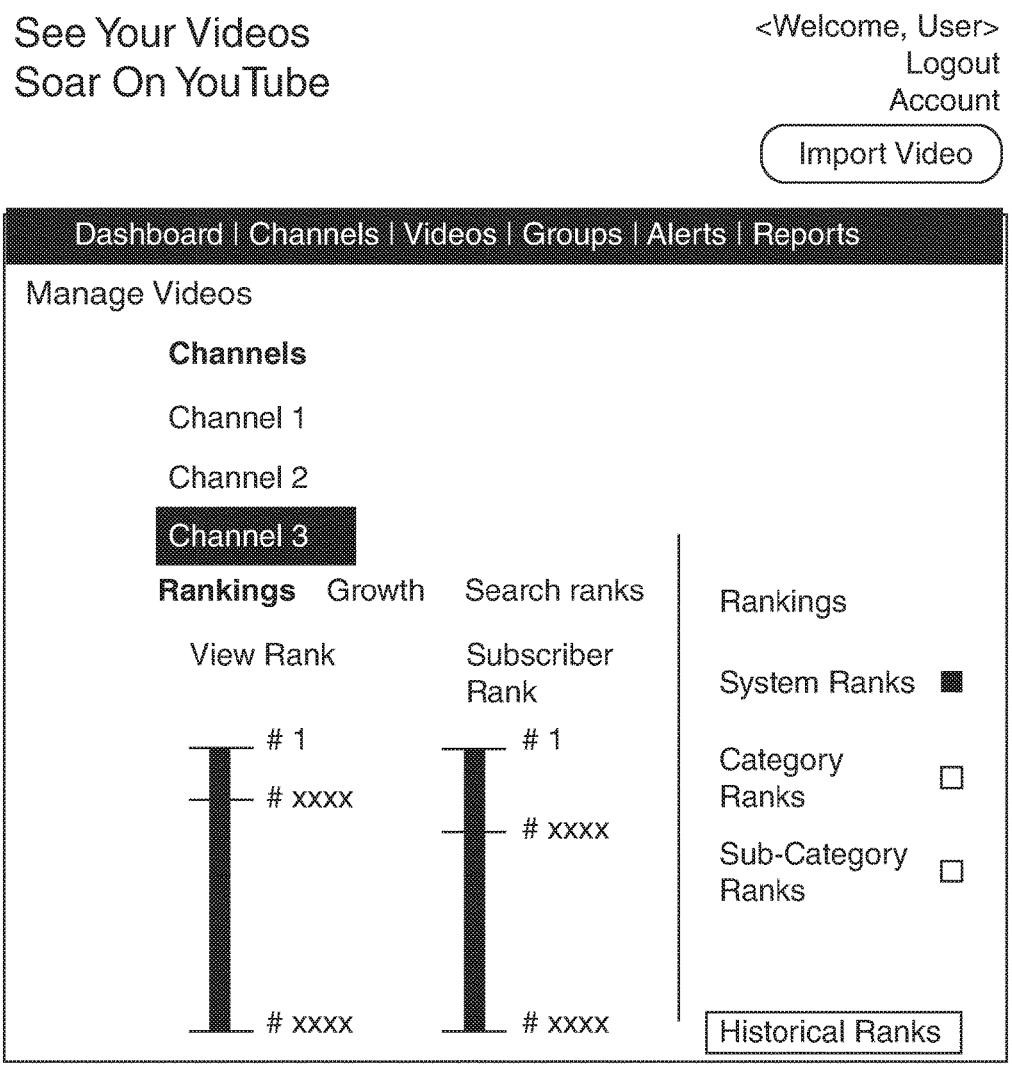
FIG. 11 shows an exemplary screenshot of a graphical user interface depicting a current view-channel rank report, according to one embodiment of the present invention.

FIG. 11 is an exemplary screenshot illustrating a Channel Rank report—current view. Here users can see where a selected channel ranks in a current timeframe within all the channels being tracked by the system. The rank report displays rank data for both video views and channel subscribers. Users can also filter the data set to obtain rank views within the channel's category and/or sub-category. It is important to note that this figure is also exemplary, and in many embodiments the report may be much longer, covering a plurality of pages.

Channel Rank Report-Historic View

Figure 12:
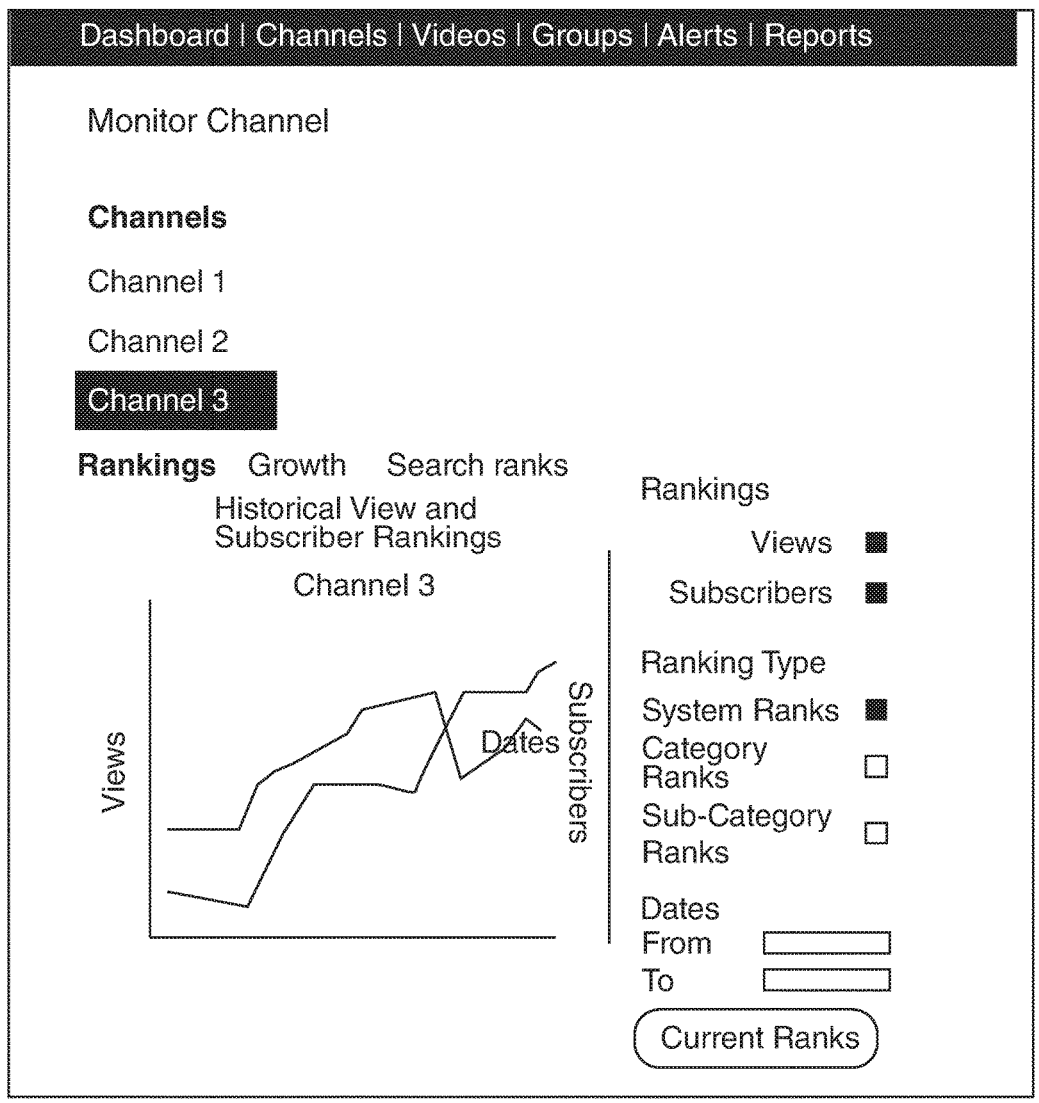
FIG. 12 shows an exemplary screenshot of a graphical user interface depicting an historical view-channel rank report, according to one embodiment of the present invention.

FIG. 12 is an exemplary screenshot illustrating a Channel Rank report—historical view. Here users can see where a select channel historically ranked between defined dates. The user selects dates using a date picker function shown. Users can view historical rank data for either video view volume, subscriber volume or any dimension measured by the system. Users can also filter the data set to obtain historical rank information within the channel's category and/or sub-category. It is important to note that this figure is also exemplary, and in many embodiments the report may be much longer, covering a plurality of pages.

Channel Growth Report-Absolute Growth View

Figure 13:
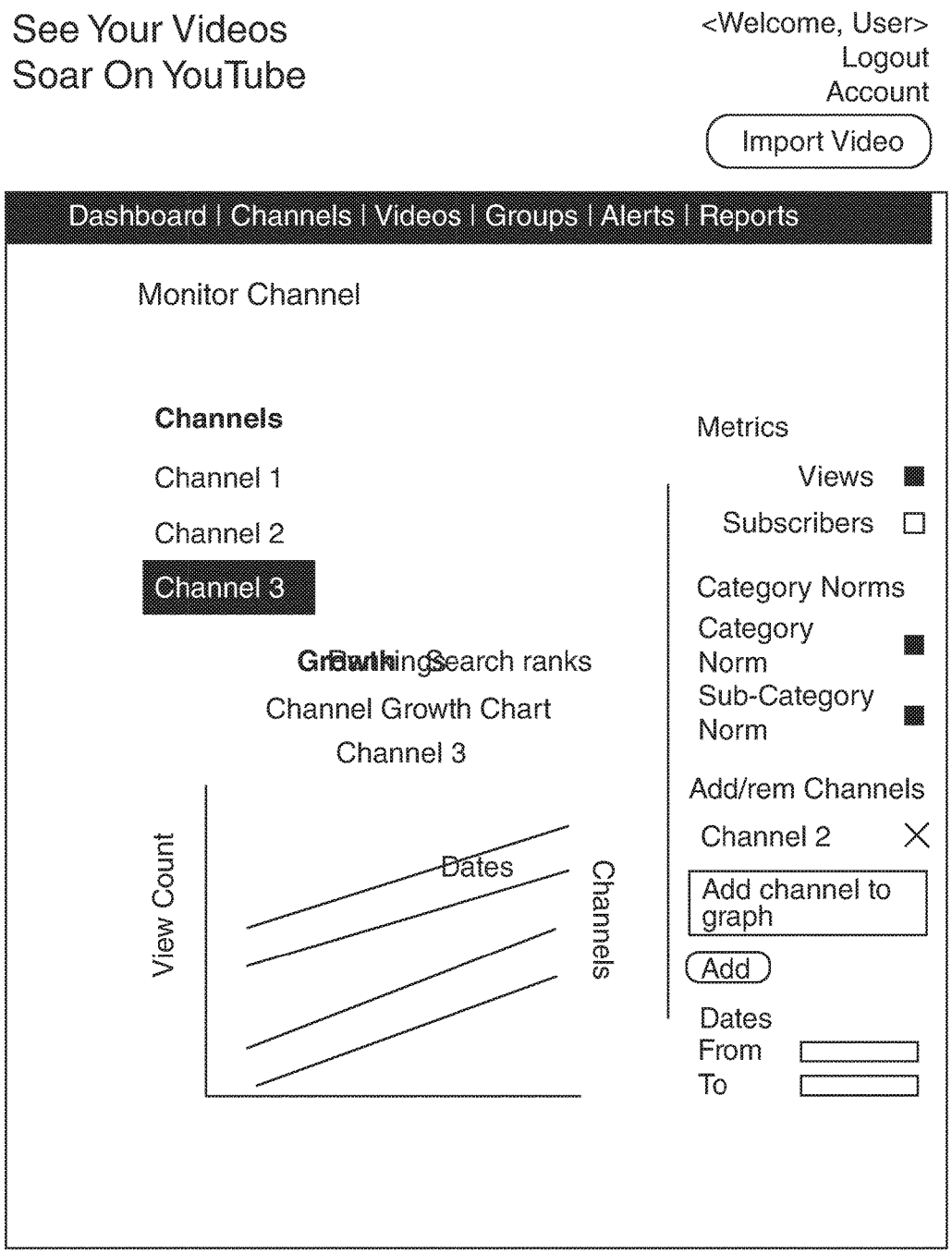
FIG. 13 shows an exemplary screenshot of a graphical user interface depicting an absolute channel growth report, according to one embodiment of the present invention.

FIG. 13 is an exemplary screenshot illustrating a Channel Growth report—absolute growth view. Here users can see the video-view growth and/or subscriber growth of a selected channel between defined dates. The user selects dates using a date picker function shown. Users can also display the average growth for the channel's category and/or sub-category. Within this report, users can also display growth data for other specific channels, which may be useful for examining direct competitors. It is important to note that this figure is also exemplary, and in many embodiments the report may be much longer, covering a plurality of pages.

Channel Growth Report-Relative Growth View

Figure 14:
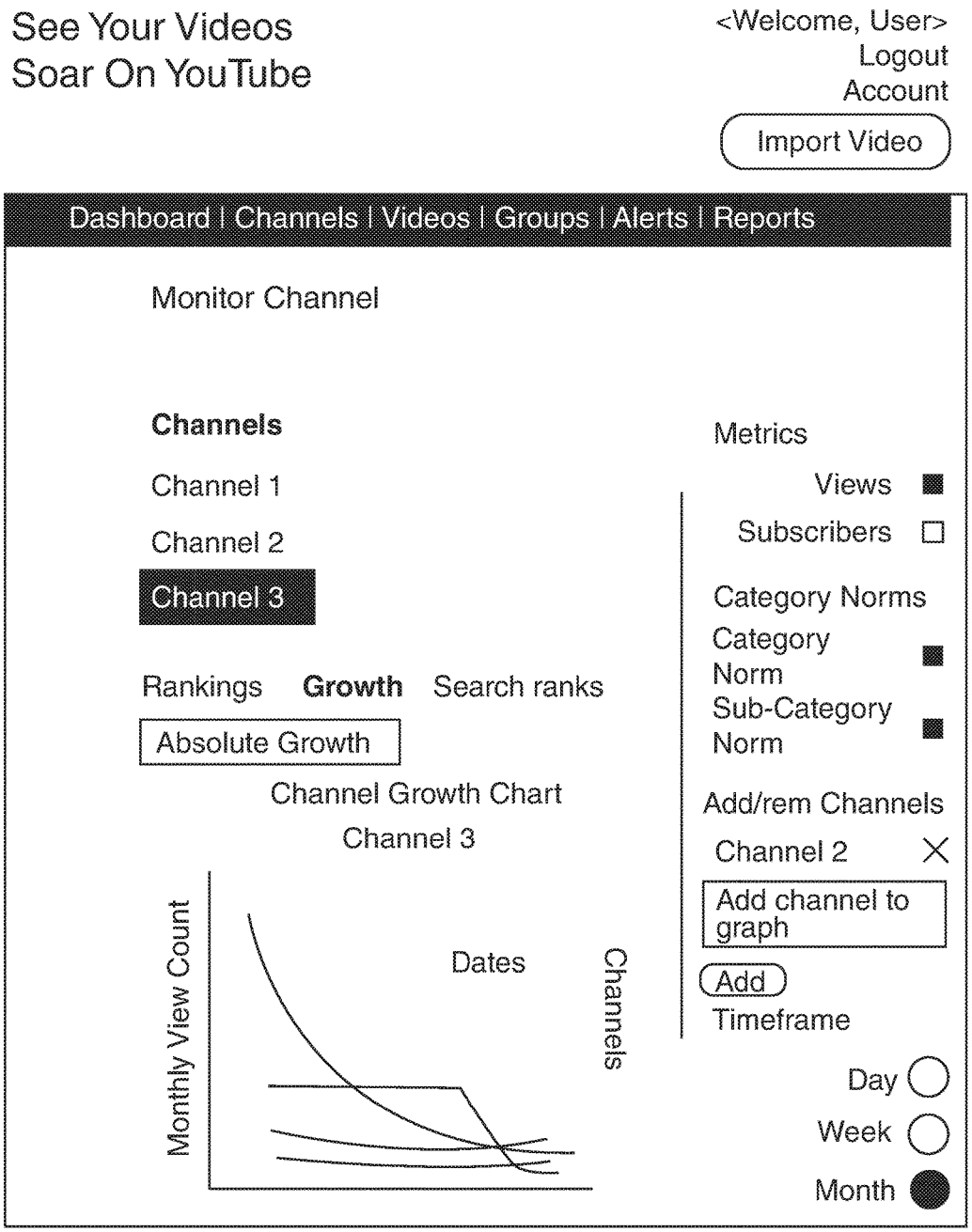
FIG. 14 shows an exemplary screenshot of a graphical user interface depicting a relative channel growth report, according to one embodiment of the present invention.

FIG. 14 is an exemplary screenshot illustrating a Channel Growth report—relative growth view. Here users can see the percent video-view growth and/or percent subscriber growth for a selected channel over a selected period of time. The user selects a timeframe (weekly, monthly, daily) and desired metrics. If the user chooses weekly, then the user will see week over week percent growth of their channel's total views or total subscriber count. Users can also display average growth for the channel's category and/or sub-category. Within this report users can also display growth data for other specific channels, also useful for examining direct competitors. It is important to note that this figure is also exemplary, and in many embodiments the report may be much longer, covering a plurality of pages.

Manage Comments

Figure 15:
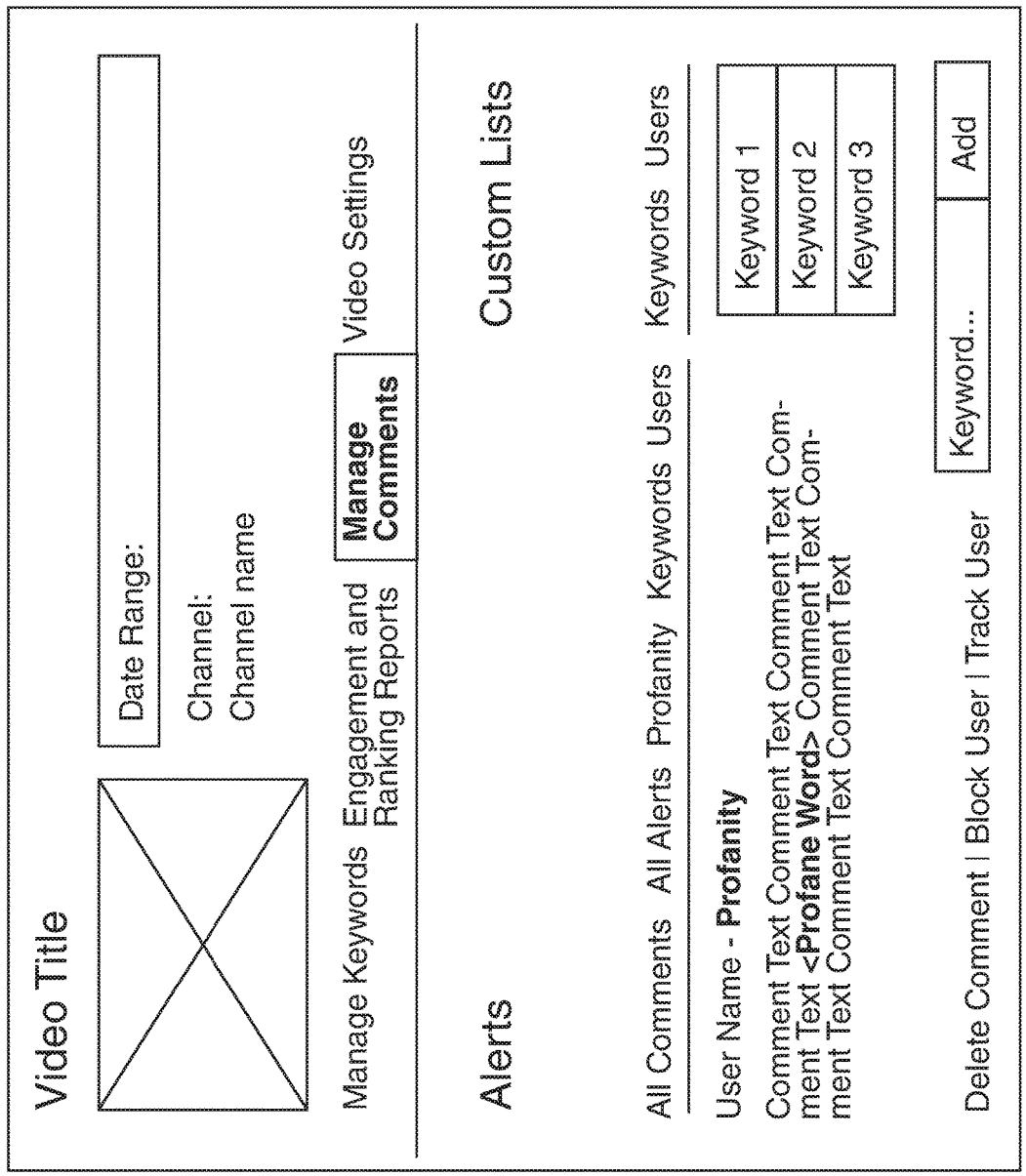
FIG. 15 shows an exemplary screenshot of a graphical user interface depicting a manage comments tool, according to one embodiment of the present invention.

FIG. 15 is an exemplary screenshot depicting a Manage Comments tool, according to one embodiment of the invention. The manage comments tool allows users to define filters for comment monitoring, including but not limited to profanity, specific users, sentiment and keywords and comments phrased in the form of a question. The user also has an ability to view all comments for a specific video. Users also have the ability to configure auto-action techniques. For instance when a defined filter is executed, such as profanity, the user may configure the system to automatically delete the comment containing the executed filter. A user may configure the alerts module, described more fully below, to send a notification when a comment in the form of a question has occurred.

Keyword Search—Video Level

Figure 16:
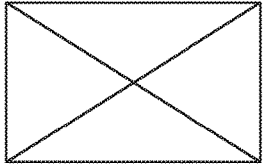
FIG. 16 shows an example screenshot of a graphical user interface illustrating a video engagement data and keyword rankings report.

FIG. 16 is an example screenshot of a graphical user interface illustrating the Video Engagement Data and Keyword Ranking report. Here the user has a visual representation of the engagement data and keyword rankings aggregated over time. The user selects a video and defines a date range using the date picker function shown. The data is displayed on a week-by-week basis with the date shown as the end date of a seven day period. Color bars on data cells indicate change relative to the prior week with green depicting growth and red depicting decline. The engagement data comprises the number of views, likes, dislikes, total likes and dislikes, and total number of comments, audience retention and video time watched for a selected video with the data aggregated for each date cell. Similarly, the keyword ranking data shows the position the video held in a search result on YouTube™ when queried against the keyword shown for the selected video. With this function, the user has access to the organic search results, over time, for each keyword the user tracks with the system. This allows the user to monitor the efficacy of their marketing techniques and subsequently make changes to improve the selected video's search ranking.

Keyword Search—Channel-Wide

FIG. 17 is an exemplary screenshot depicting a channel-wide Search Rankings-by-Keyword report. In a weekly version of this report, users can see which video in a given channel ranked highest in YouTube™'s search results for each keyword (originally entered in the keyword section). The report displays the baseline result and then weekly results thereafter keeping all historical weekly data visible. The monthly version of this report displays all videos from a given channel that ranked against each keyword in YouTube™'s search results originally entered in the keyword section, and what the rank is.

In some embodiments users are able to reveal certain data points for videos that rank higher than their own videos against any keyword. Using this function in combination with other functions made available by the system a user may learn what the competitors are doing that outperform the user's own videos. A metadata roll back/state preservation tool, further described below, is integrated with this as well as stand-alone.

Dashboard

Figure 18:
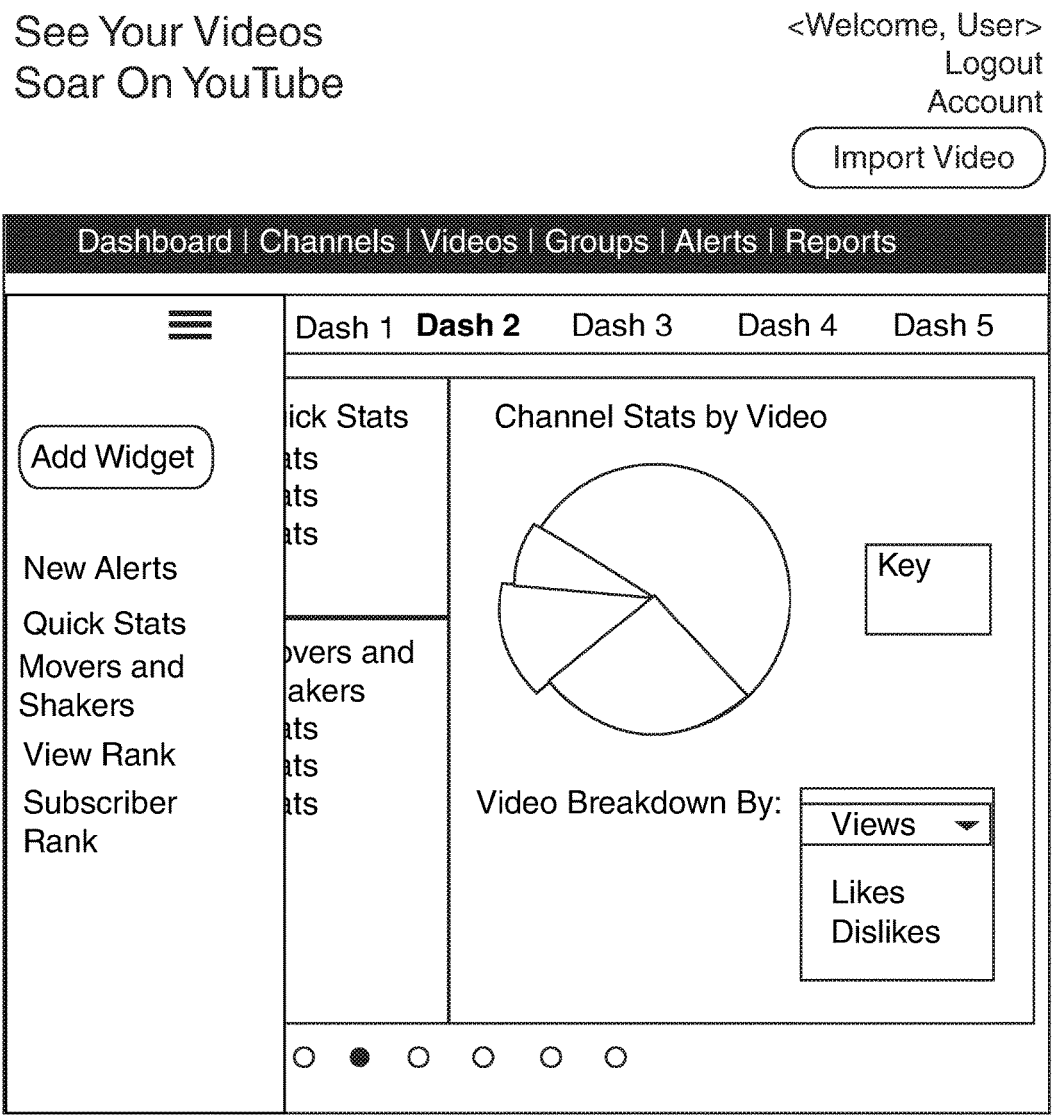
FIG. 18 shows an exemplary screenshot of a graphical user interface depicting a user dashboard of the system.

FIG. 18 is an exemplary screenshot depicting a dashboard enabling a user to control and practice many of the functions described in embodiments of the invention. The dashboard may operate as a user's home page, where the user has access to system tools including but not limited to video data and reports and content management and optimization tools. Included is a link to user account information. A user can configure and personalize his or her own dashboard by selecting various interactive graphics and dragging and dropping them on to blank areas of their current dashboard. This customizable tiled setup allows the user maximal flexibility to track and monitor exactly what is important to the user. The user can create and paginate through multiple dashboards allowing for even further customization.

Alerts

FIG. 19 is an exemplary screenshot depicting an Alerts tool. With the Alerts tool a user can define, for example, an email address and a mobile phone number for an SMS, or other message, as alert methods. Users can choose to receive an alert in the event of just about any change in conditions in the data that user is tracking. Users may also temporarily disable or pause any alert. In addition to the ability to set up alerts, users may be notified when alerts are executed. Many of the alerts will also be able to be displayed within the dashboard both in a standalone fashion and as part of an overall 'New Alerts' widget.

Graphing Utility

Figure 20:
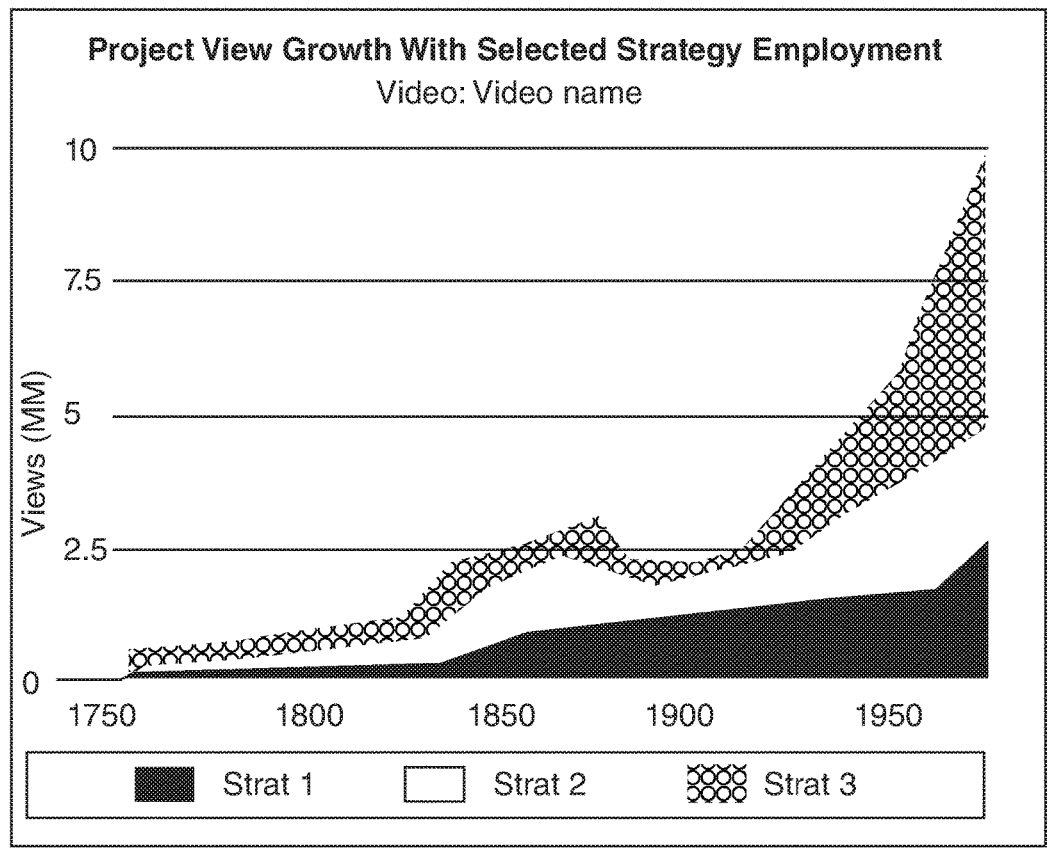
FIG. 20 is a graph created with a graph tool in one embodiment, displaying to a user projected results by strategy.

Users may see and better understand growth by using graphing utilities provided by the system. Growth over time is projected and different strategies are layered on top of one another showing how each strategy contributes to the overall projected growth. FIG. 20 is a graph created with a graph tool in one embodiment, displaying to a user projected (predicted) results by strategy.

Channel Growth Wizard

In one embodiment of the invention the system determines strategies for maximal growth on a variety of dimensions including but not limited to, views, subscribers, conversion, rate of growth, channel score, competitive superiority, creative quality, search presence, total engagement, video uploads, video content cadence, video length. Such strategies may be manually created and stored in some embodiments, but may be created by algorithm in other embodiments utilizing historical record of application and growth in similar cases, promoting perhaps similar products and services. A new user can select from among several strategies, and may track results and amend or reselect strategies as a result of performance. In some embodiments a tool may be provided wherein a user may select a strategy and the system may project probable results of employing that strategy, given the user's current content and situation.

In one aspect of the invention the system keeps a historical record of user activities, strategies and results, and provides tools enabling comparison of current plans and strategies with historical data, which enables prediction of probabilities of success, and in some cases also makes suggestions for changing strategies based on such comparisons and predictions.

Metadata Rollback/State Management

In one aspect of the system a user is enabled to change and update metadata in the user's channels in YouTube™. The metadata a user enters originally, this typically being, but not limited to, title, description and various tags, is stored by the system, and other versions of the same metadata later added or changed are saved, and tools are provided for a user to revert to different stored versions to affect searchability and performance.

Taxonomy Manager

Figure 21:
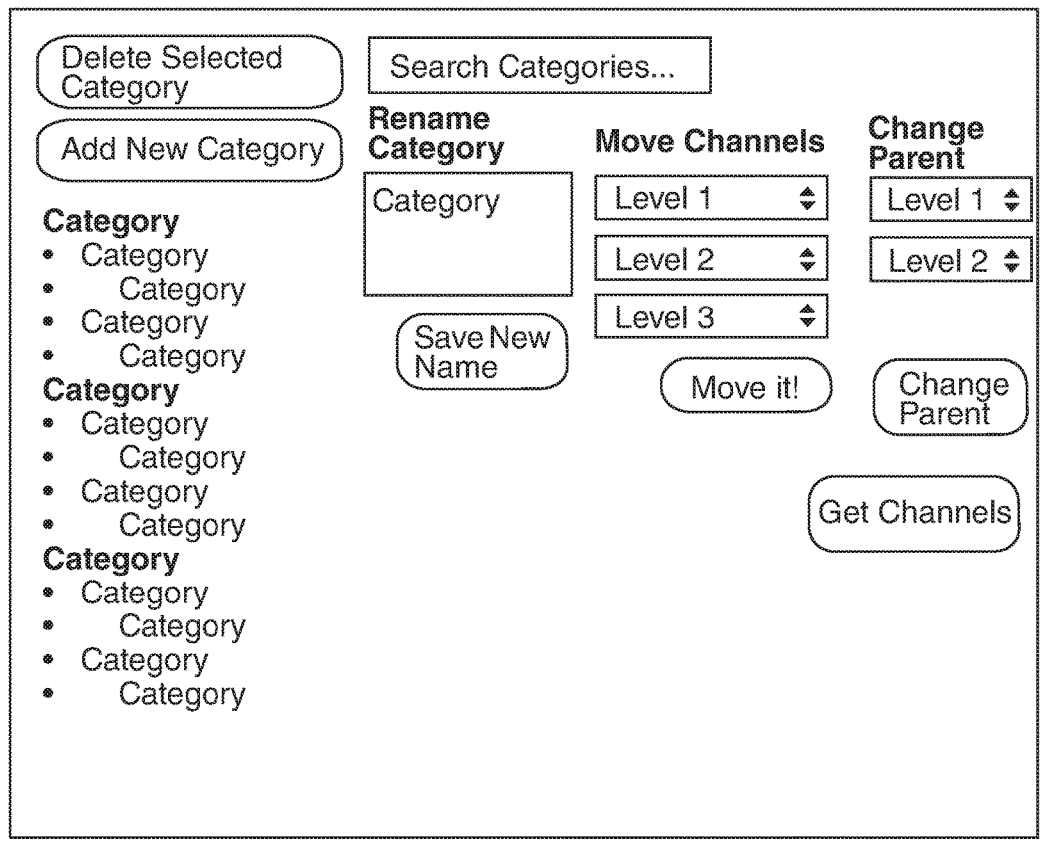
FIG. 21 is an exemplary screenshot of a taxonomy manager in an embodiment of the invention.
Figure 22:
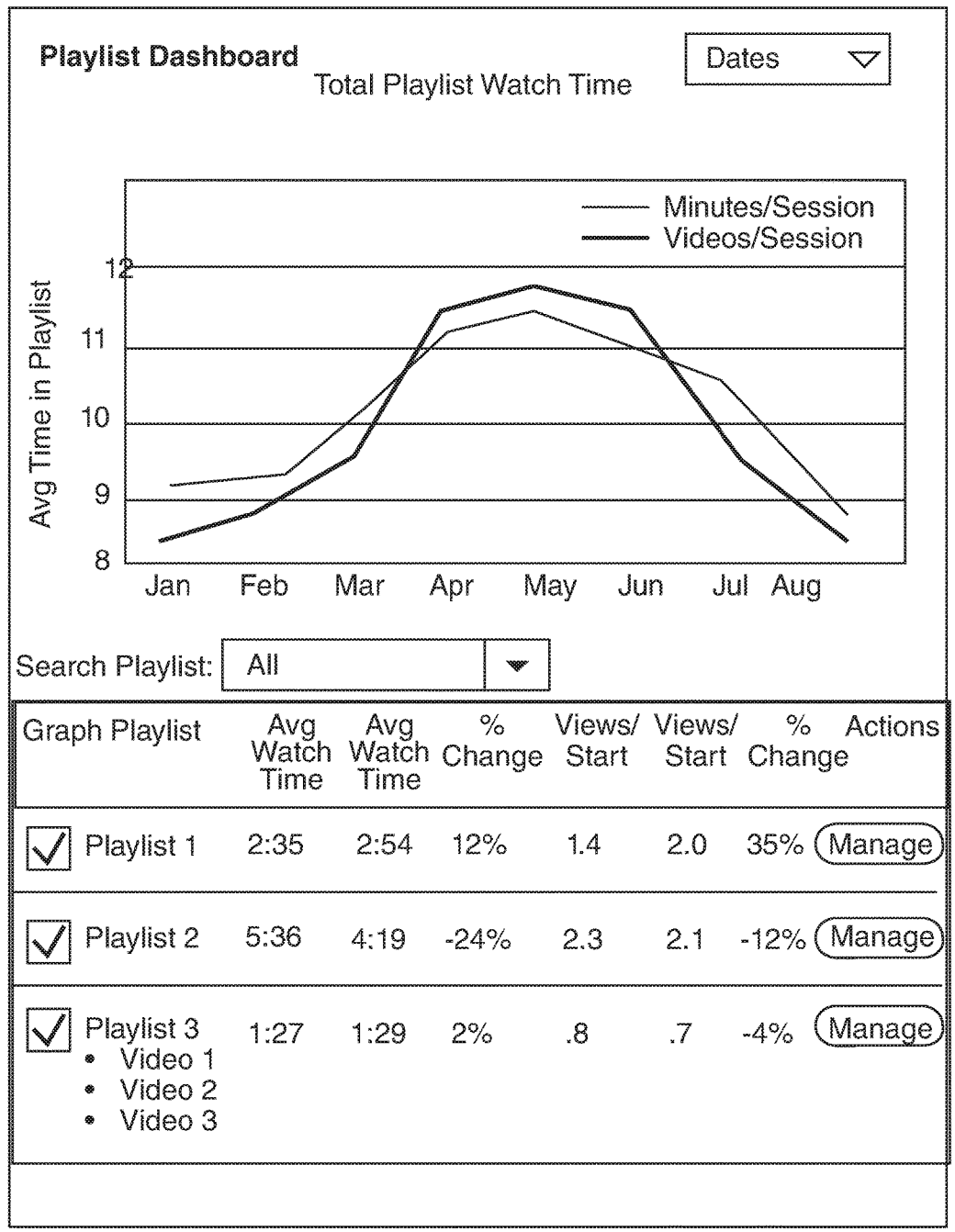
Figure 23:
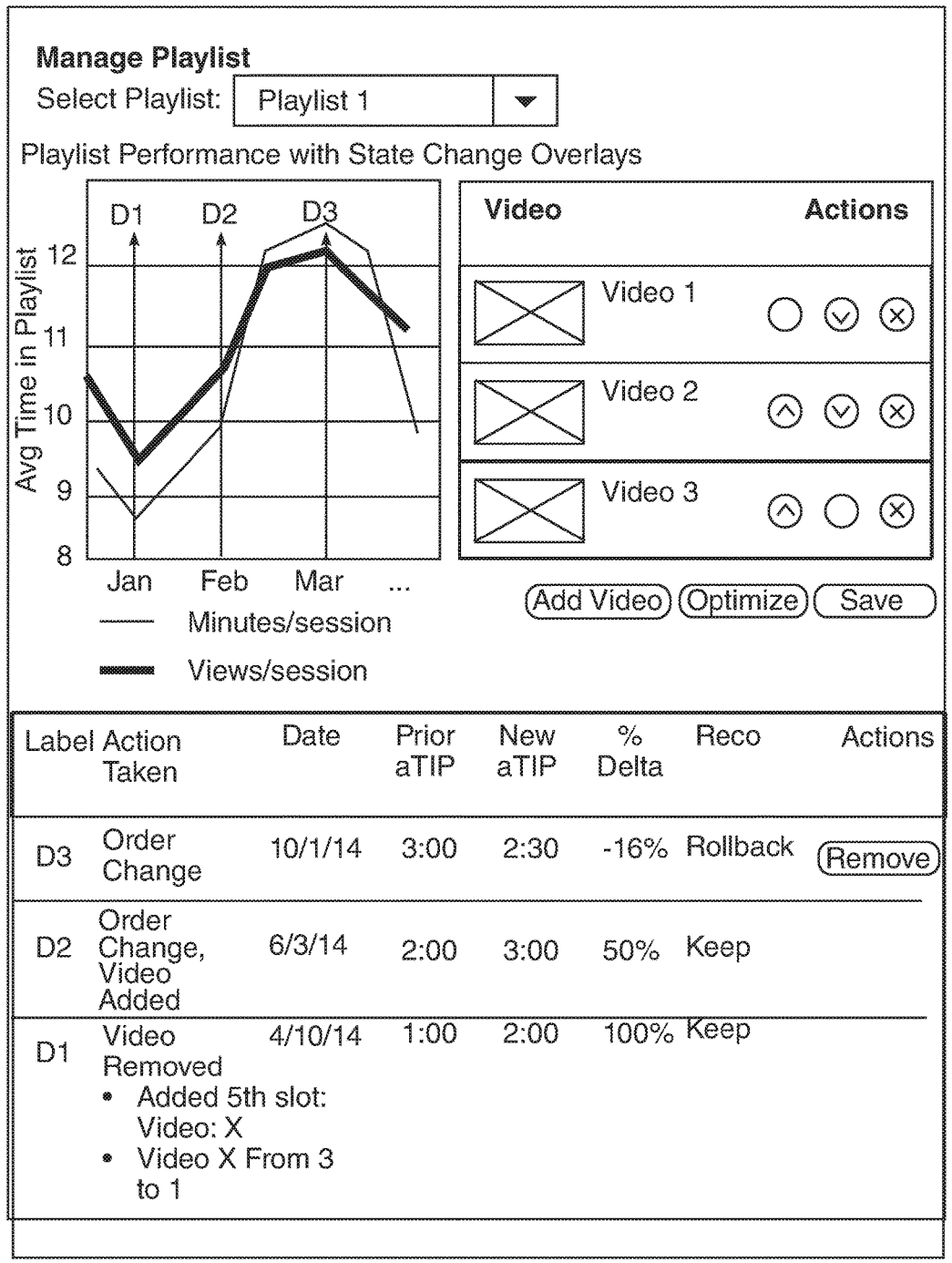
Figure 26:
Figure 29:
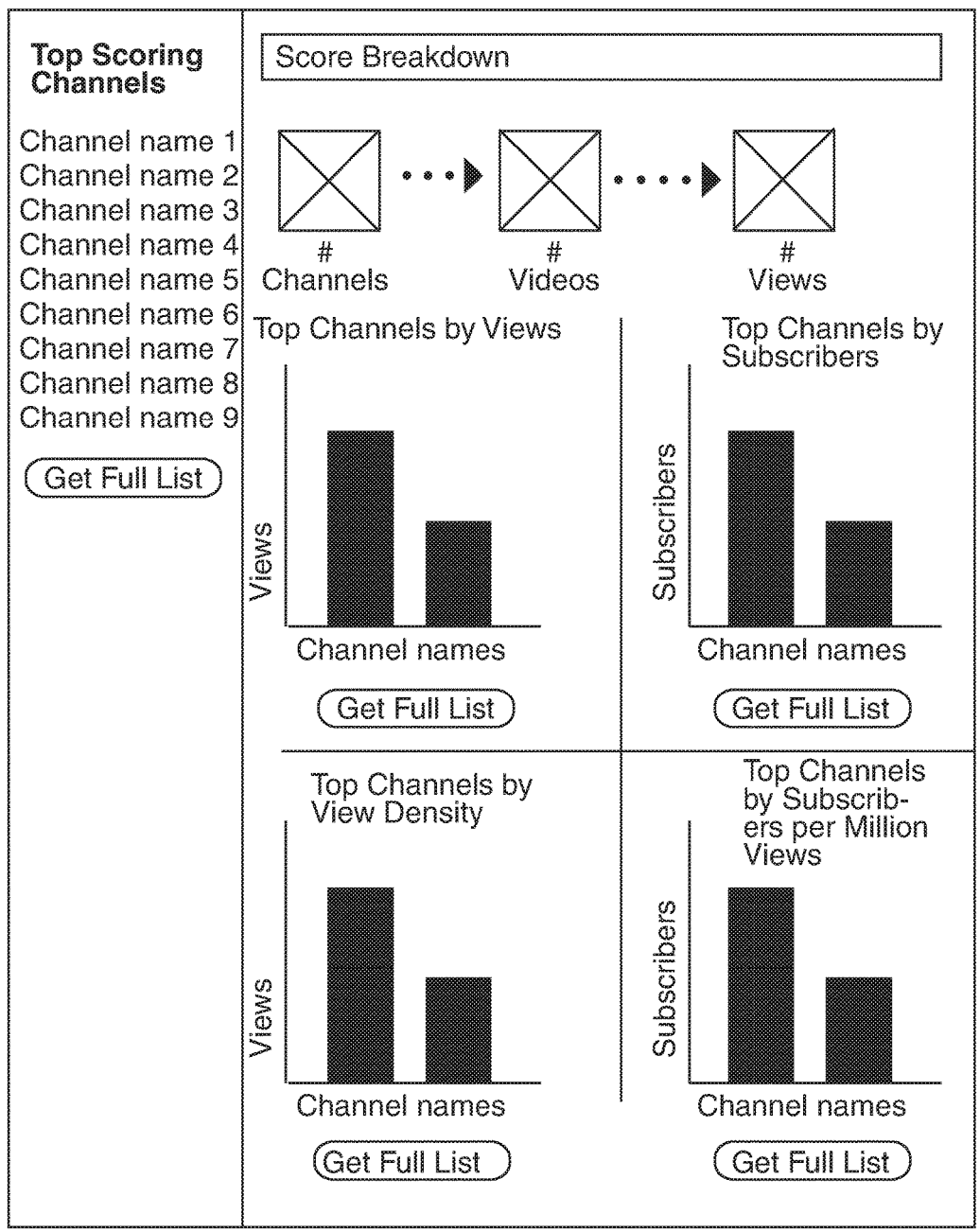
Figure 30:
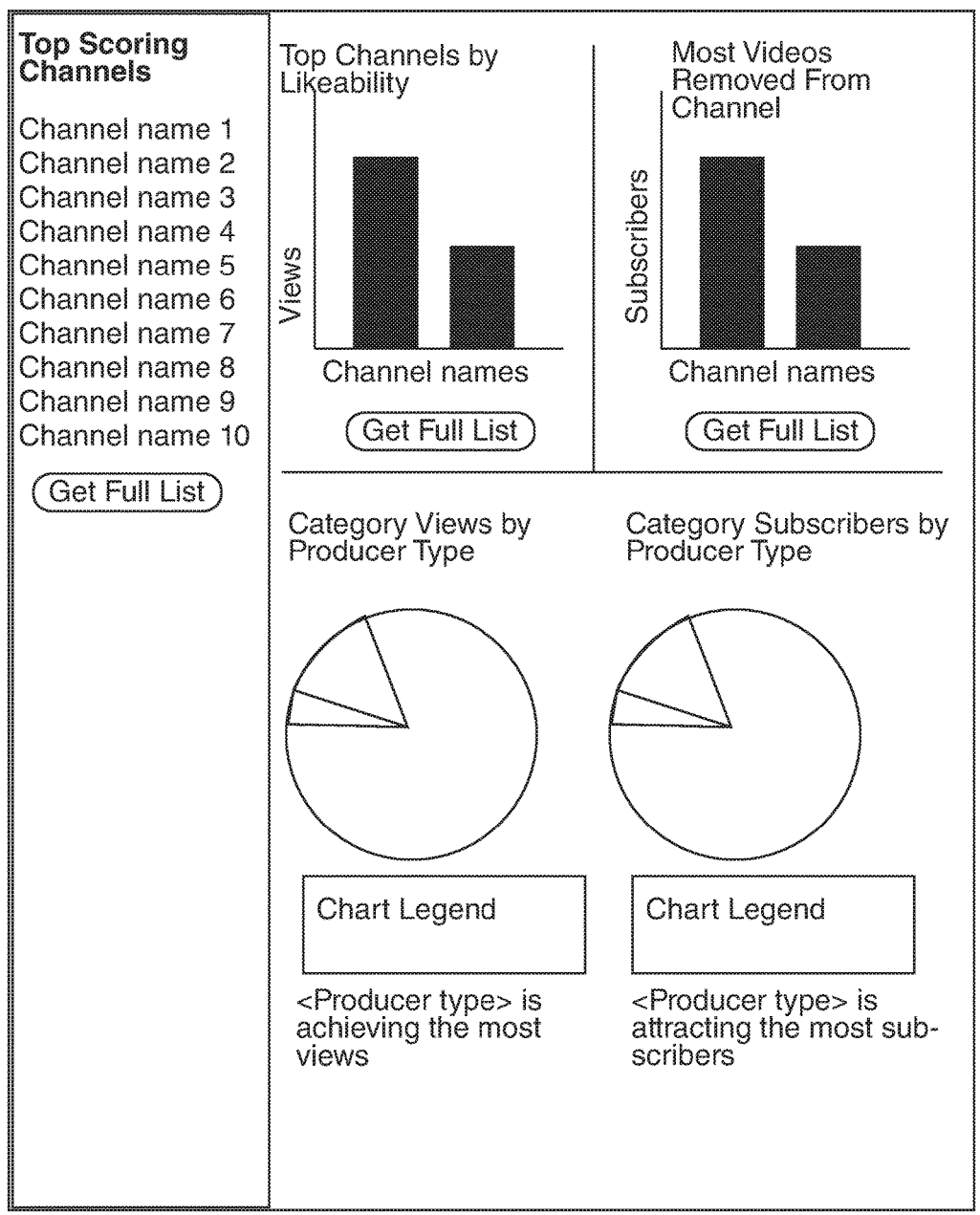
Figure 31:
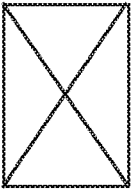
Figure 32:
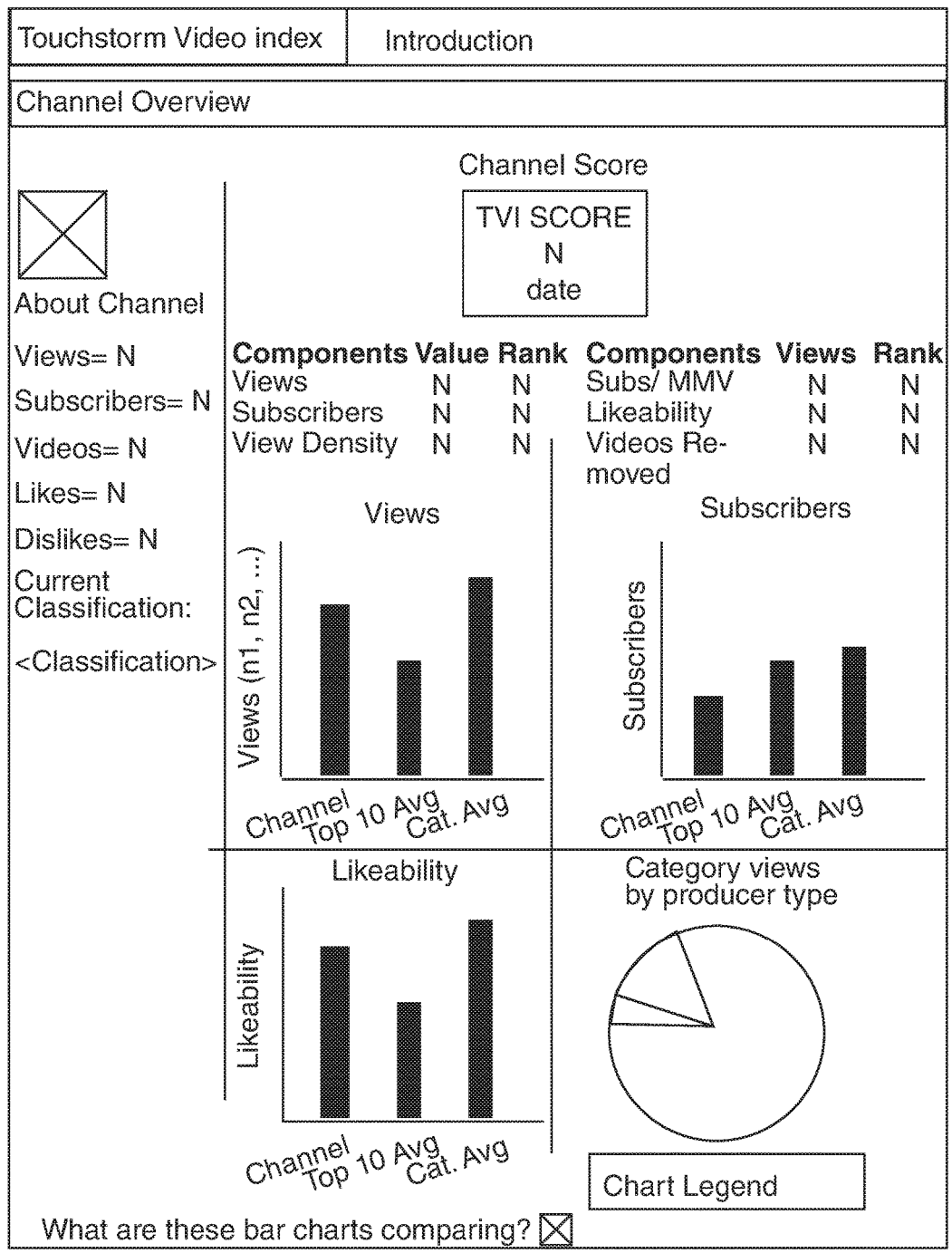
Figure 33:
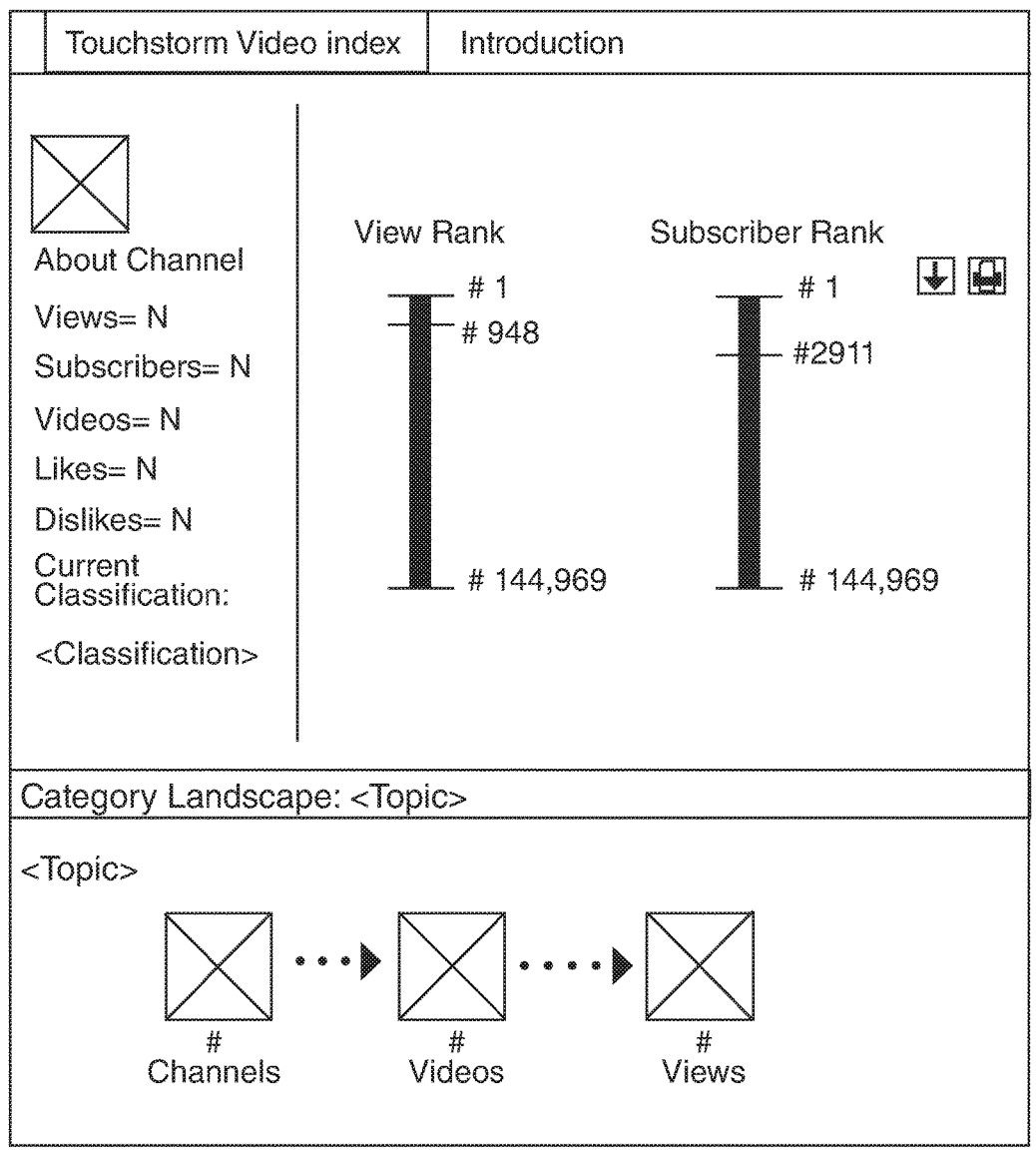
Figure 34:
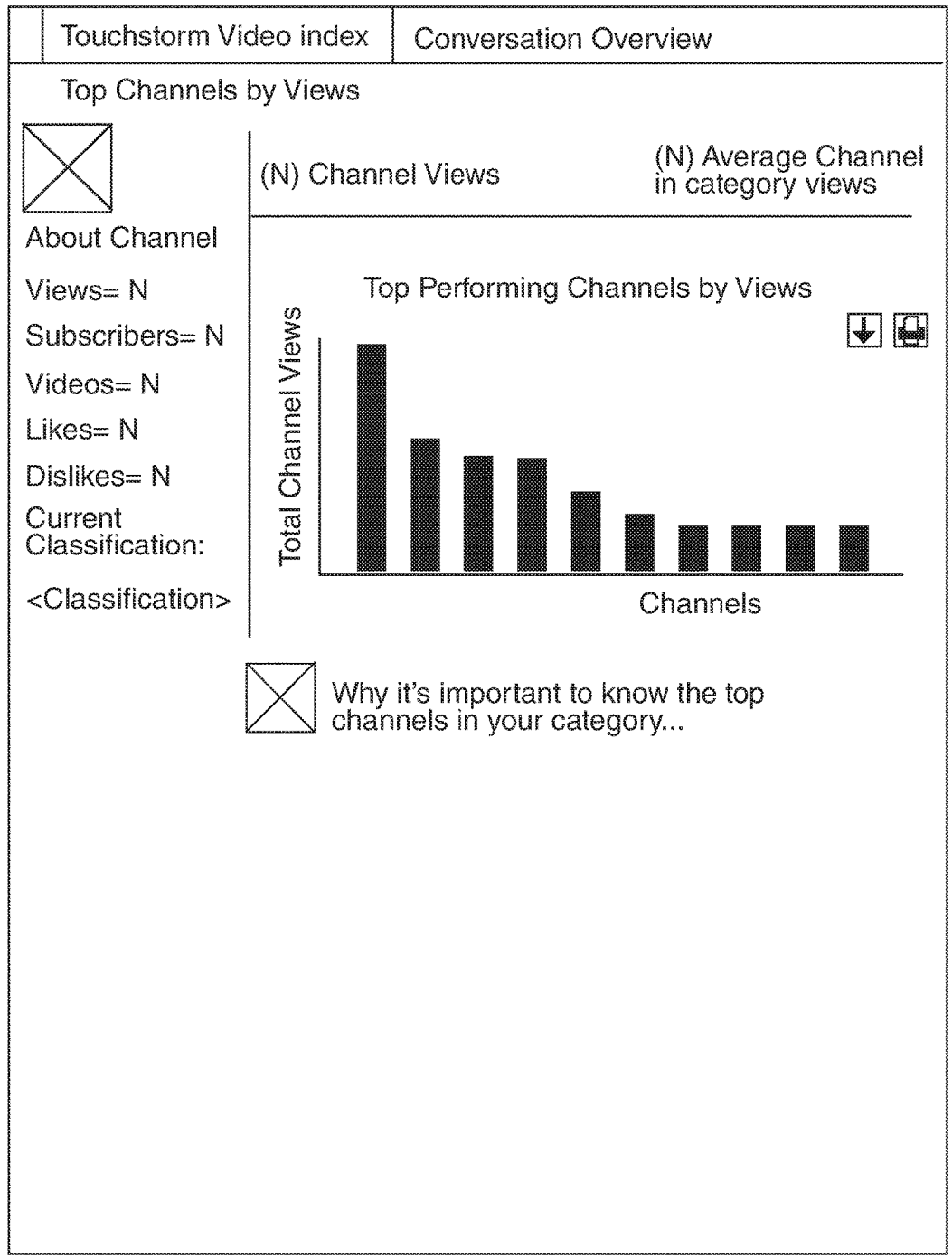
Figure 35:
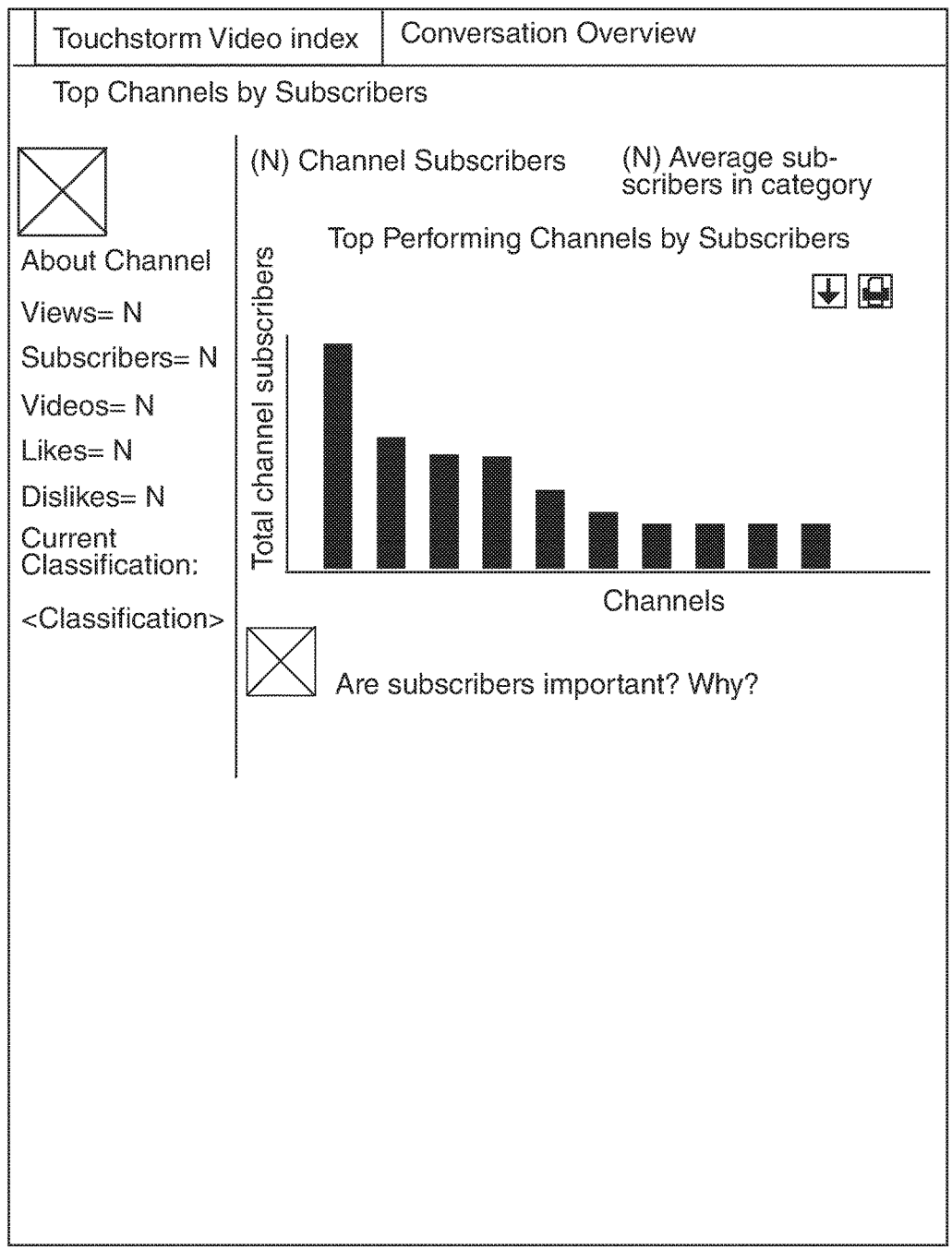
Figure 36:
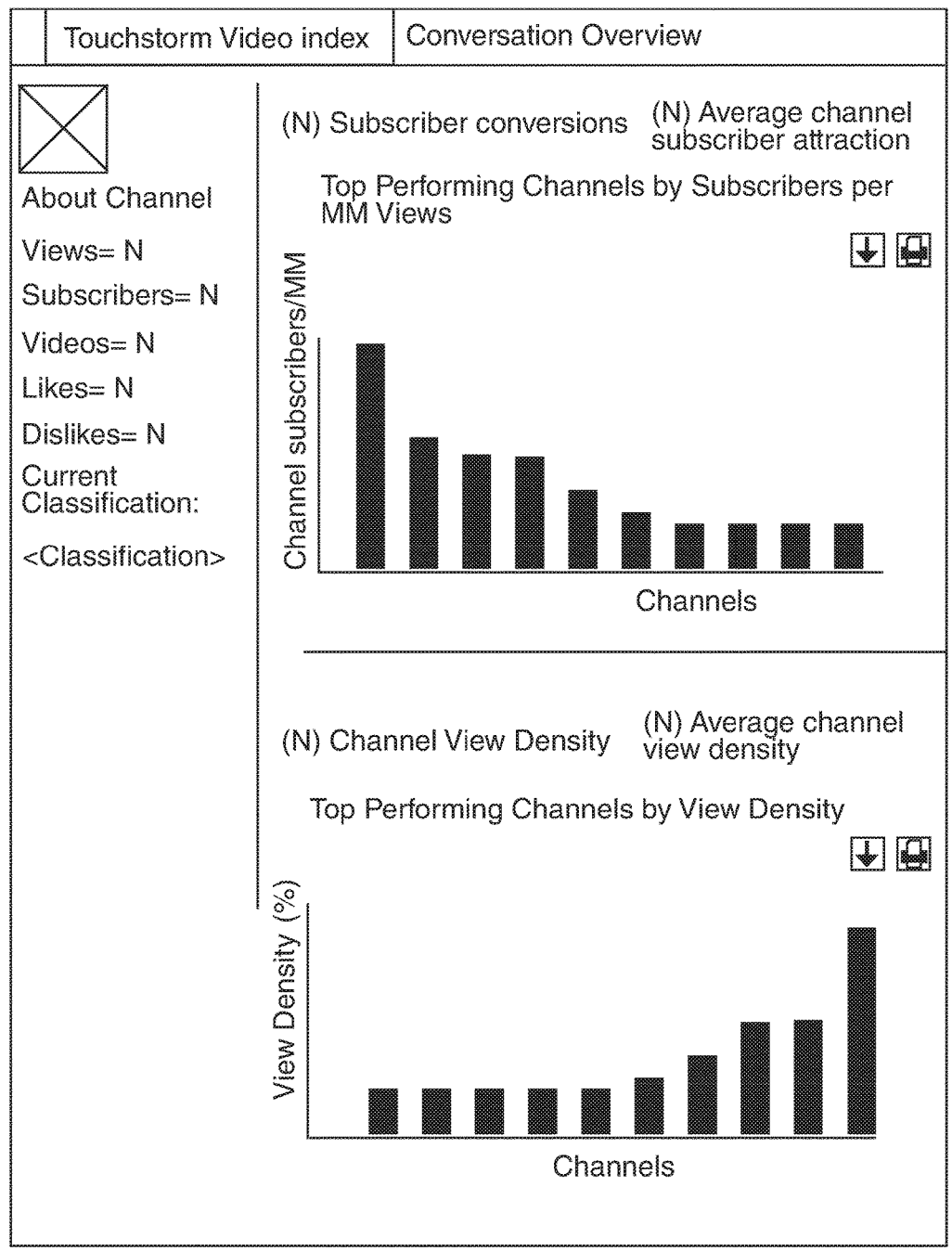
Figure 37:
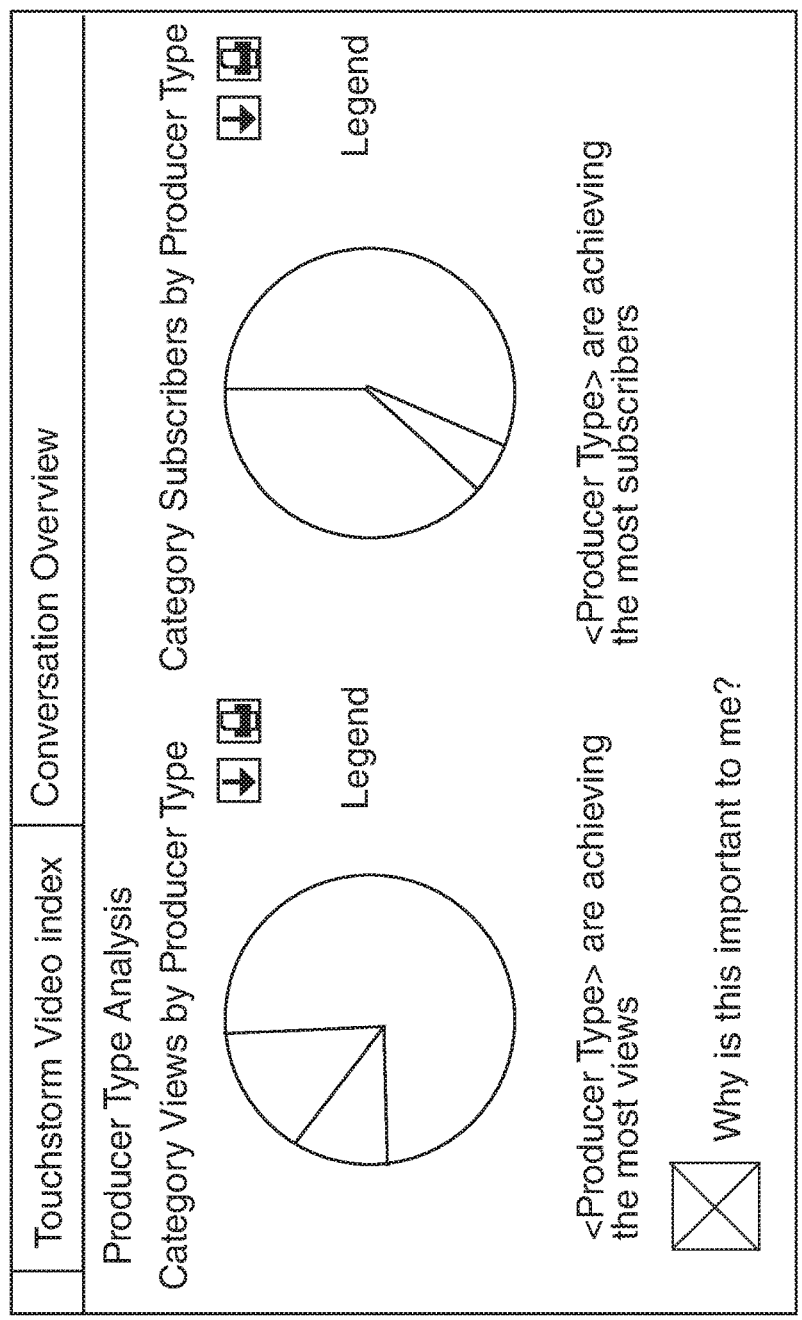
Figure 38:
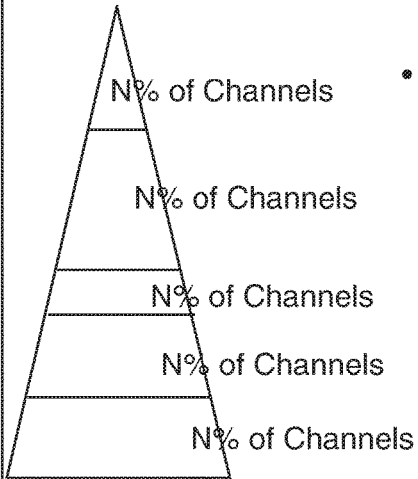
Figure 41:
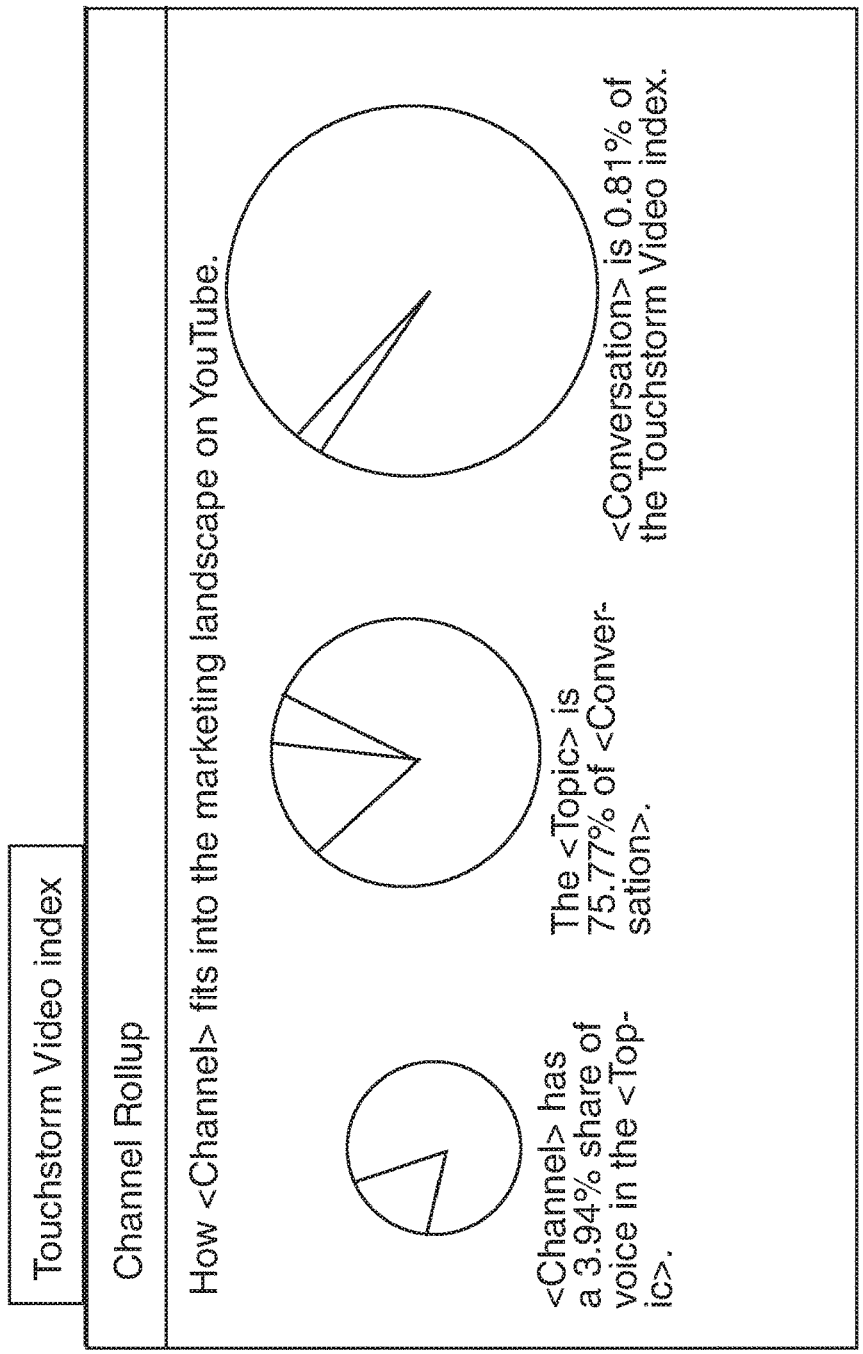
Figure 43:
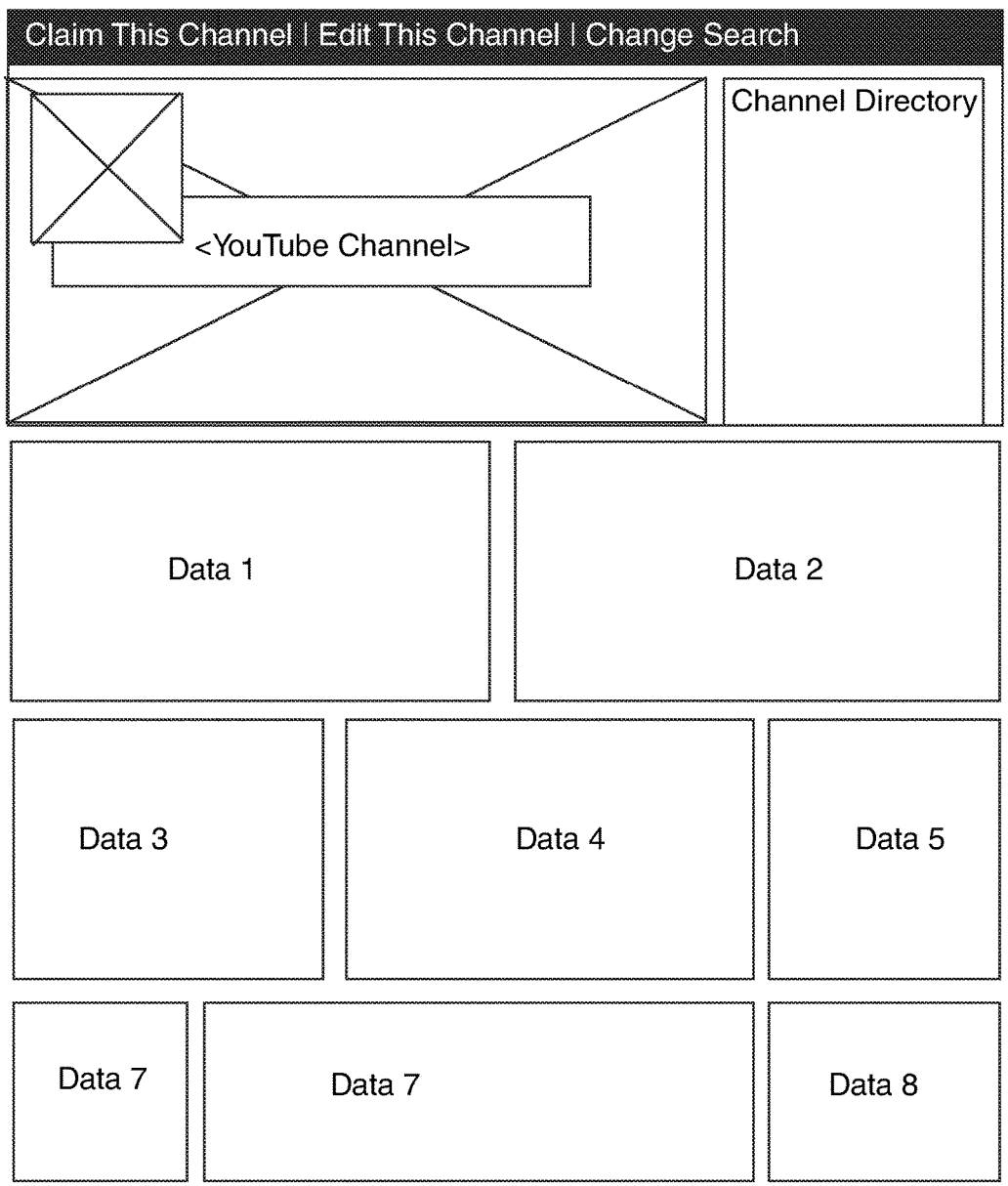
Figure 44:
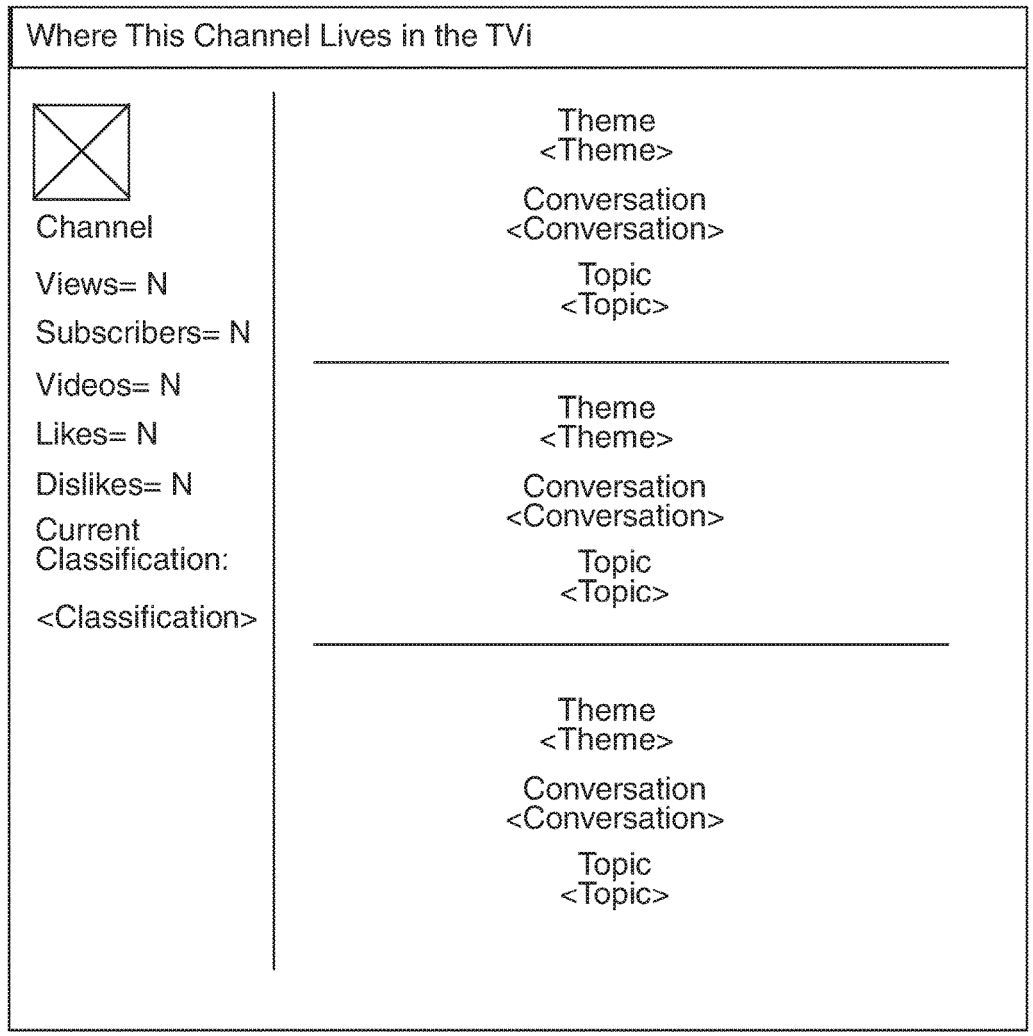
Figure 45:
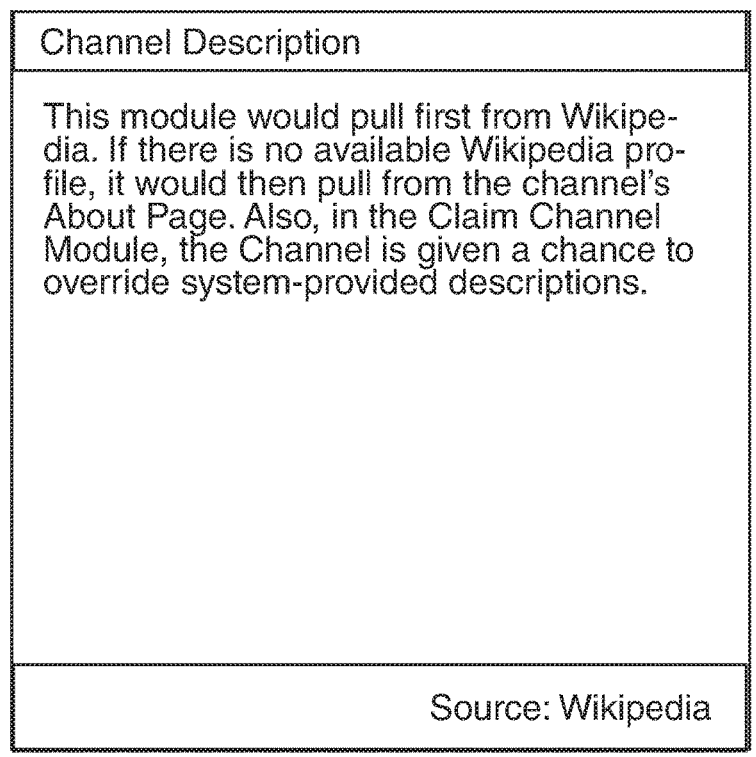
Figure 46:
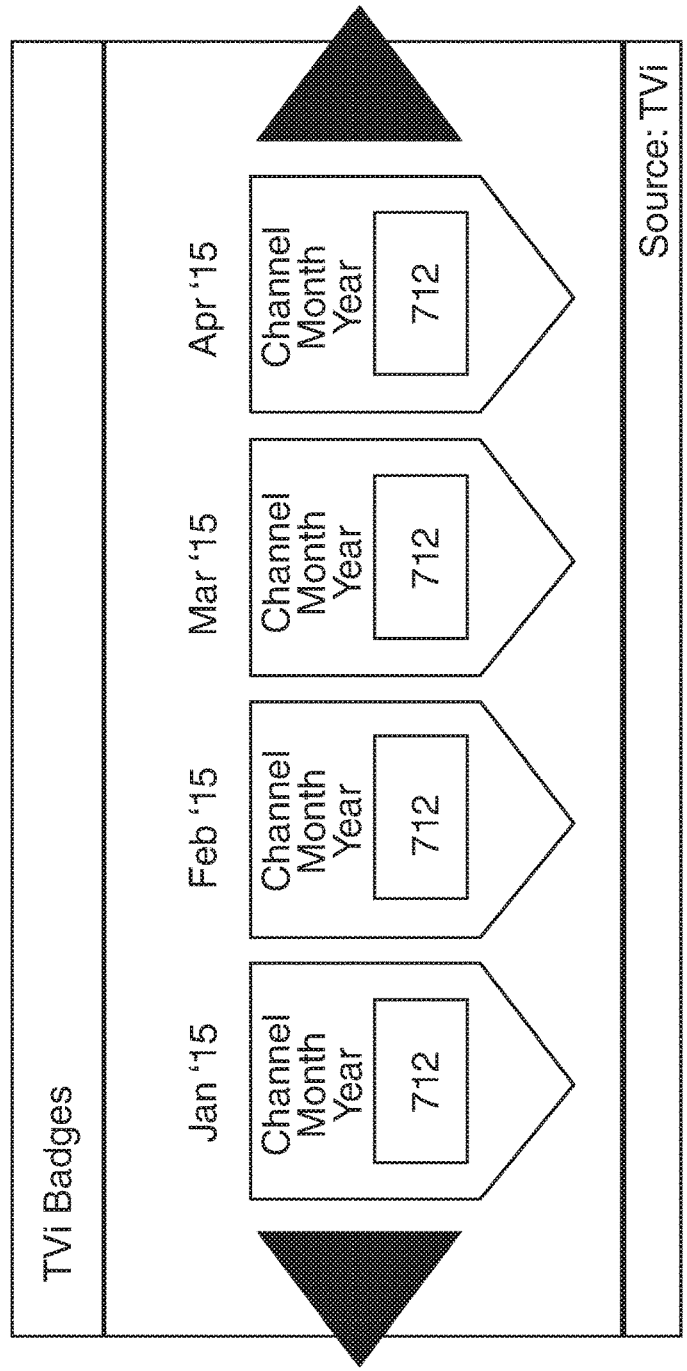
Figure 47:
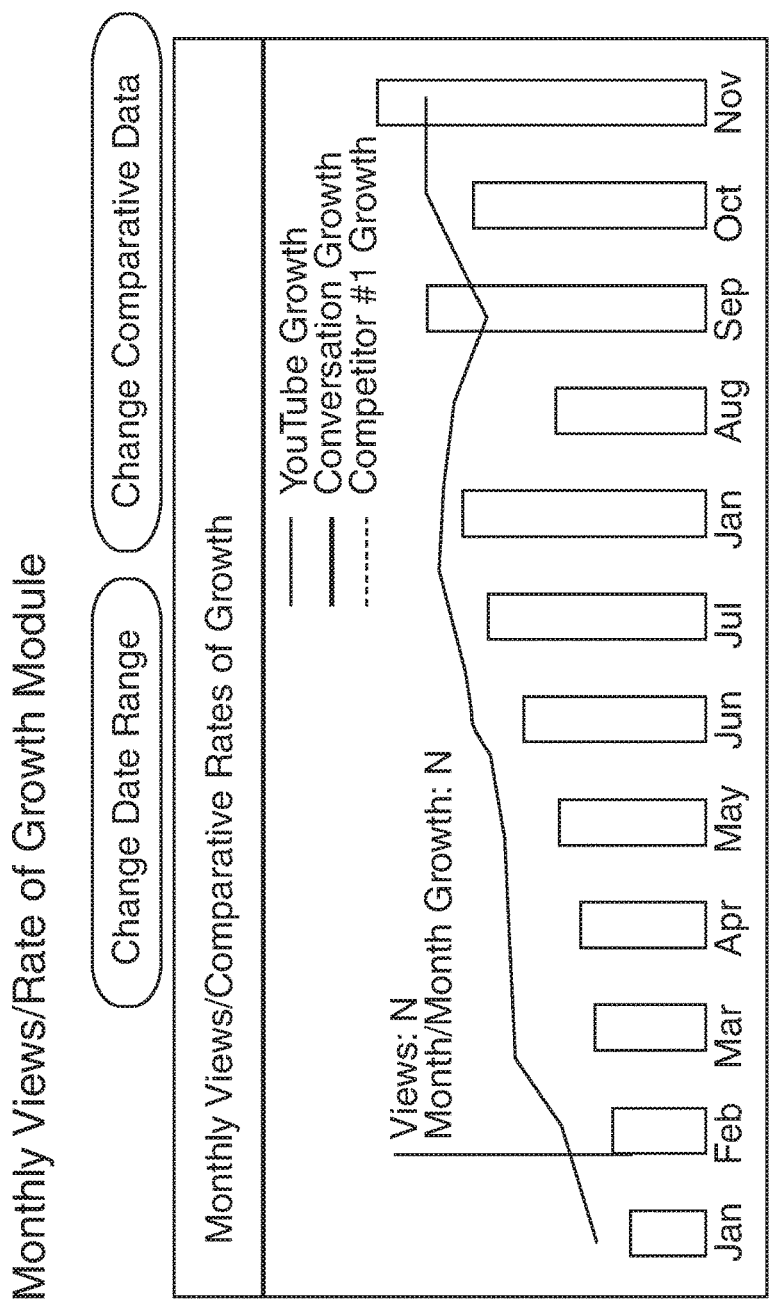
Figure 48:
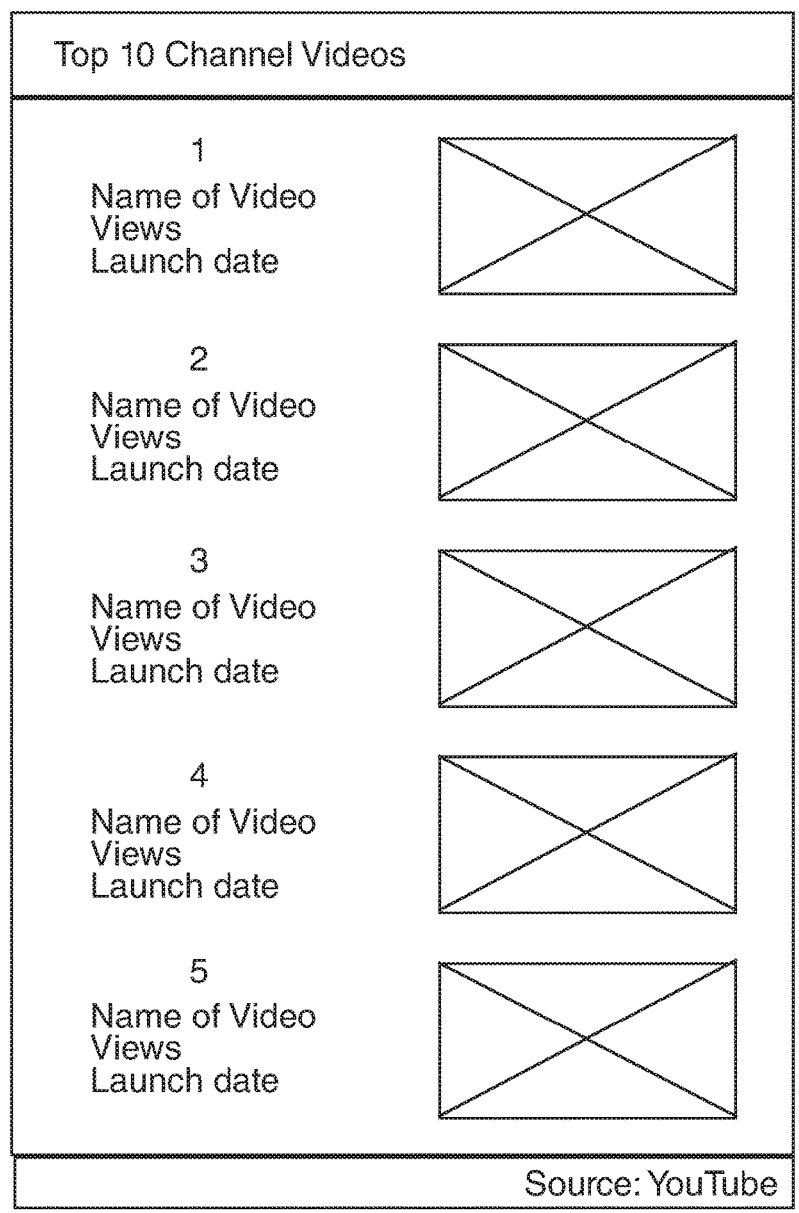
Figure 49:
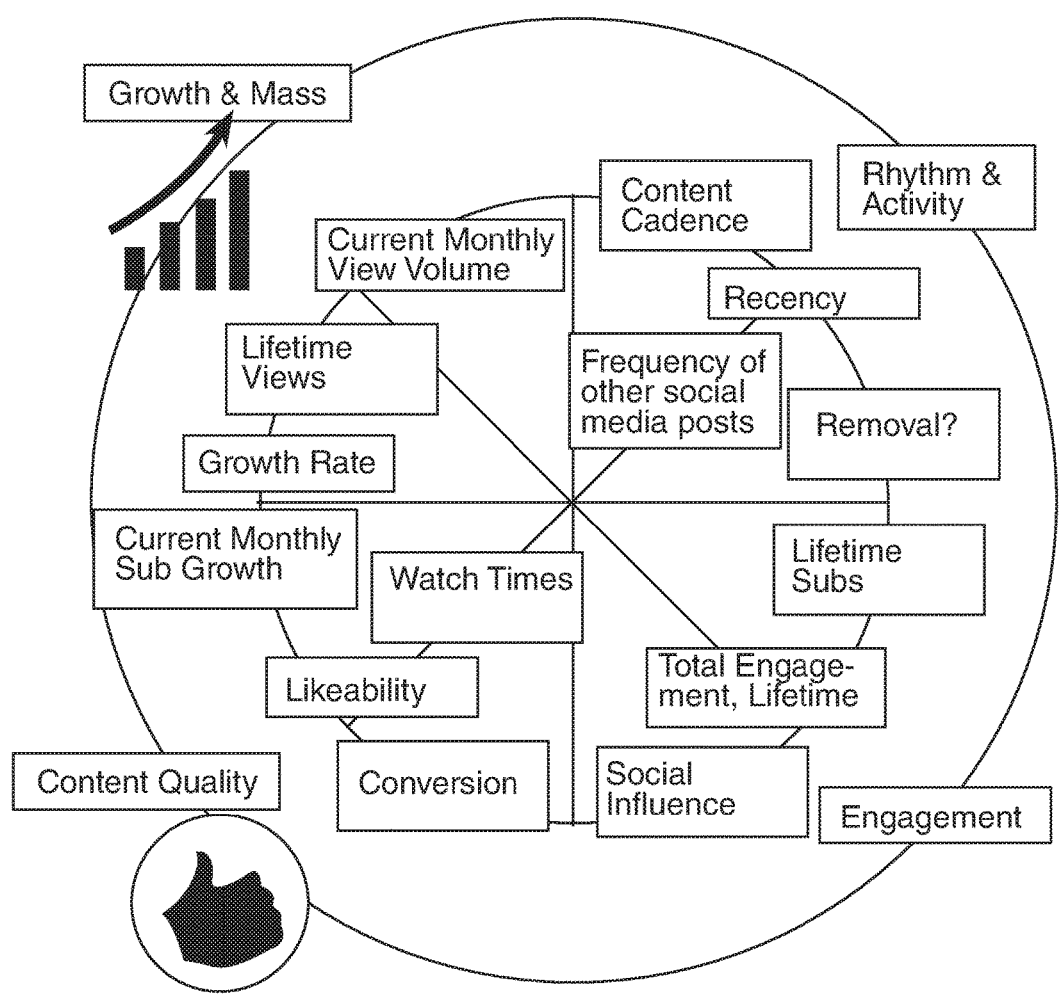
Figure 50:
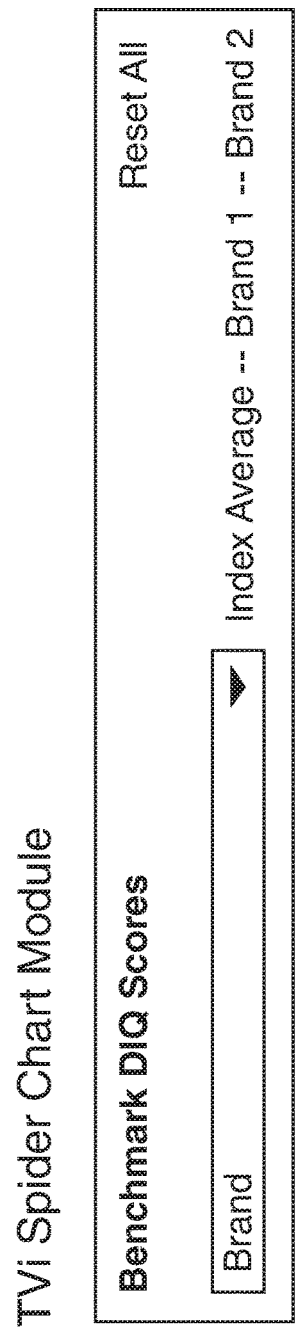
Figure 52:
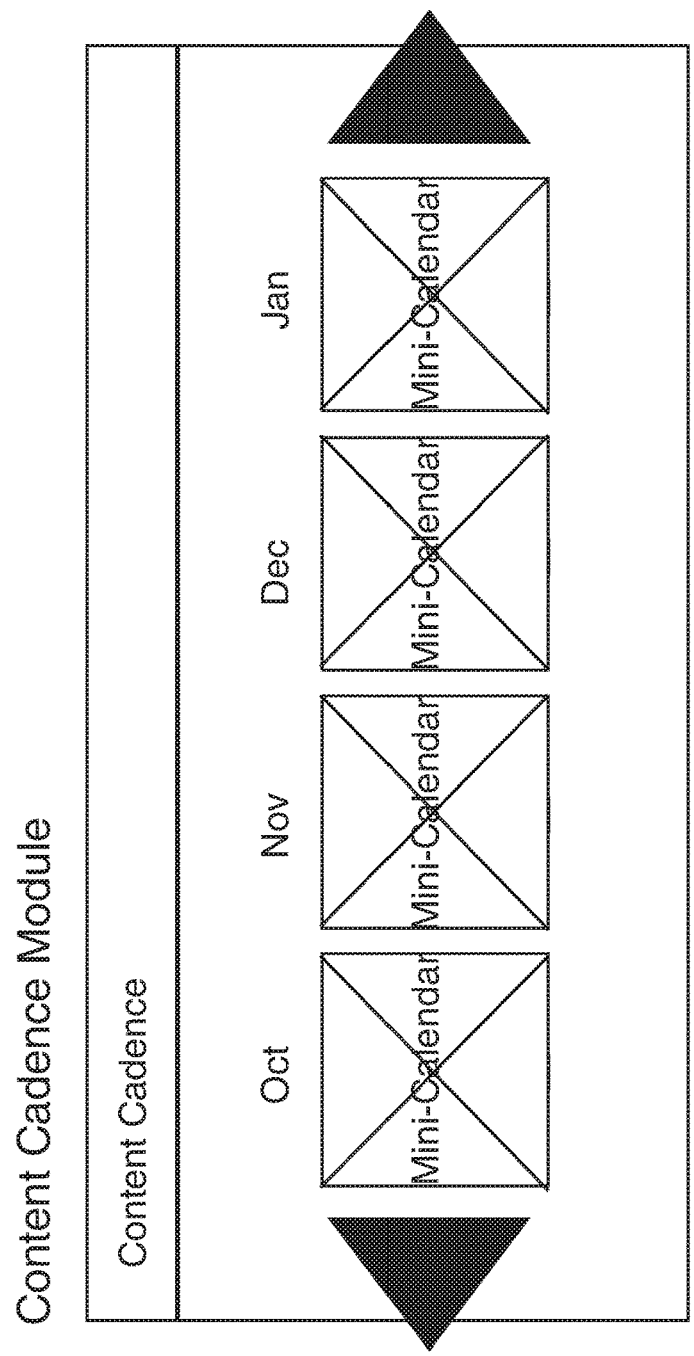
Figure 53:
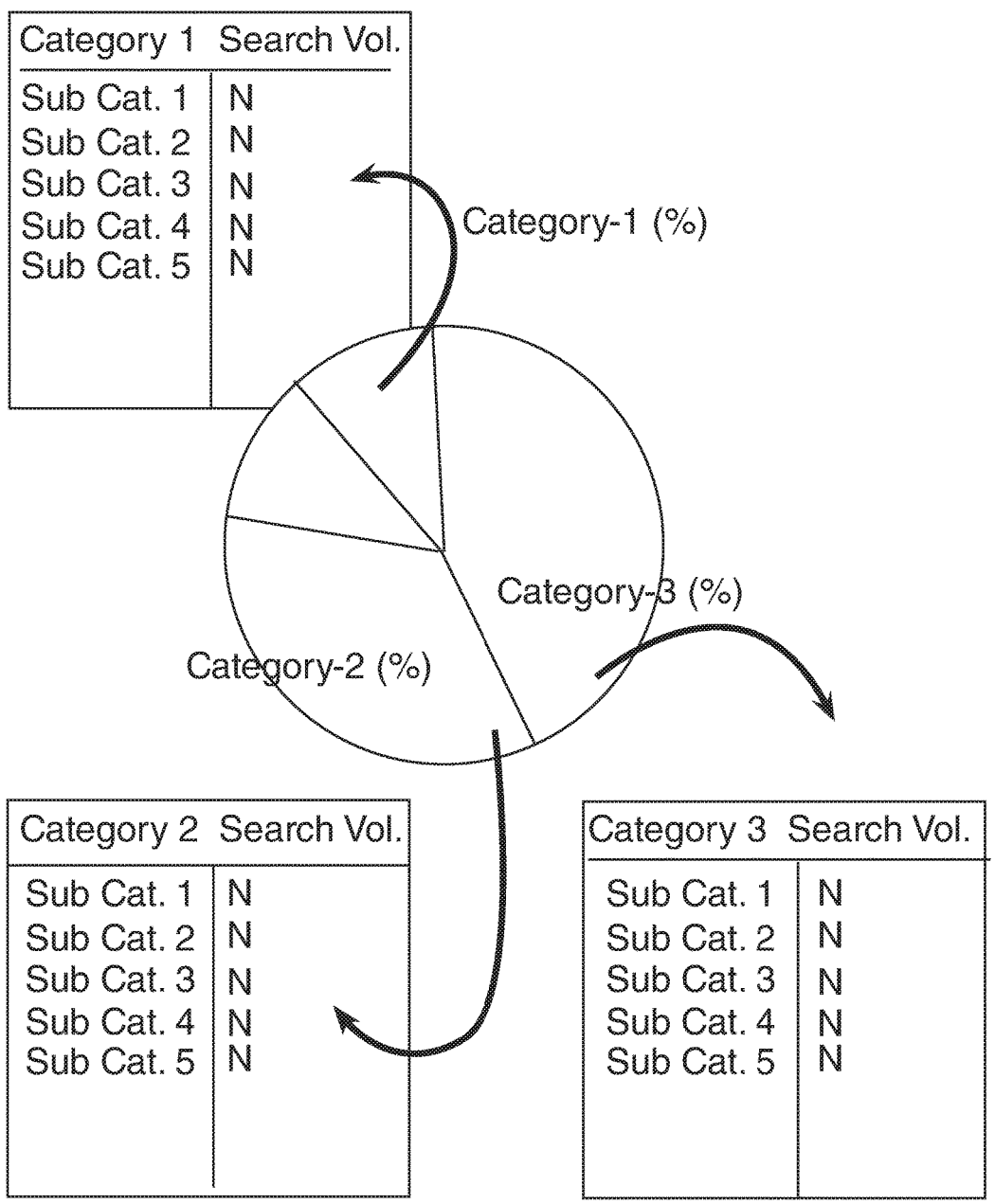
Figure 55:
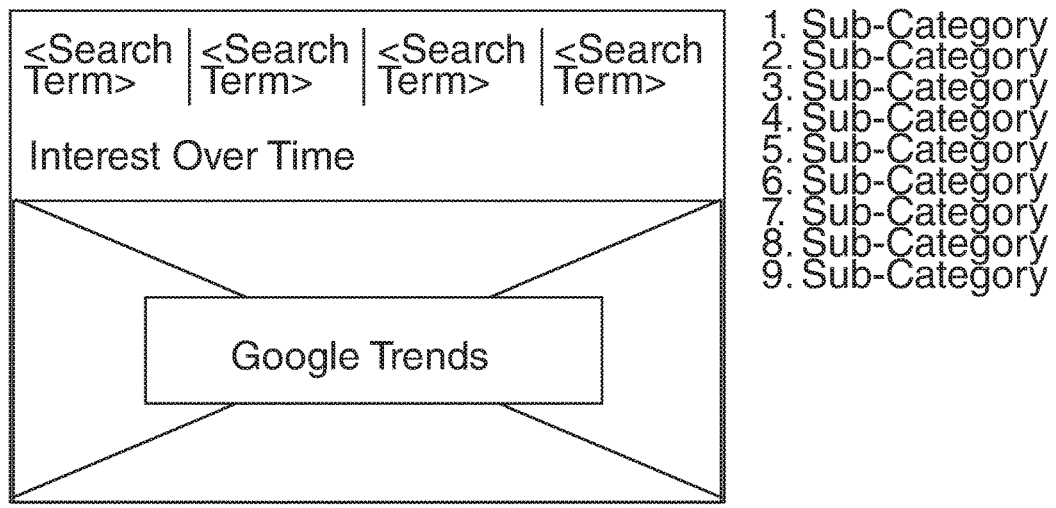
Figure 56:
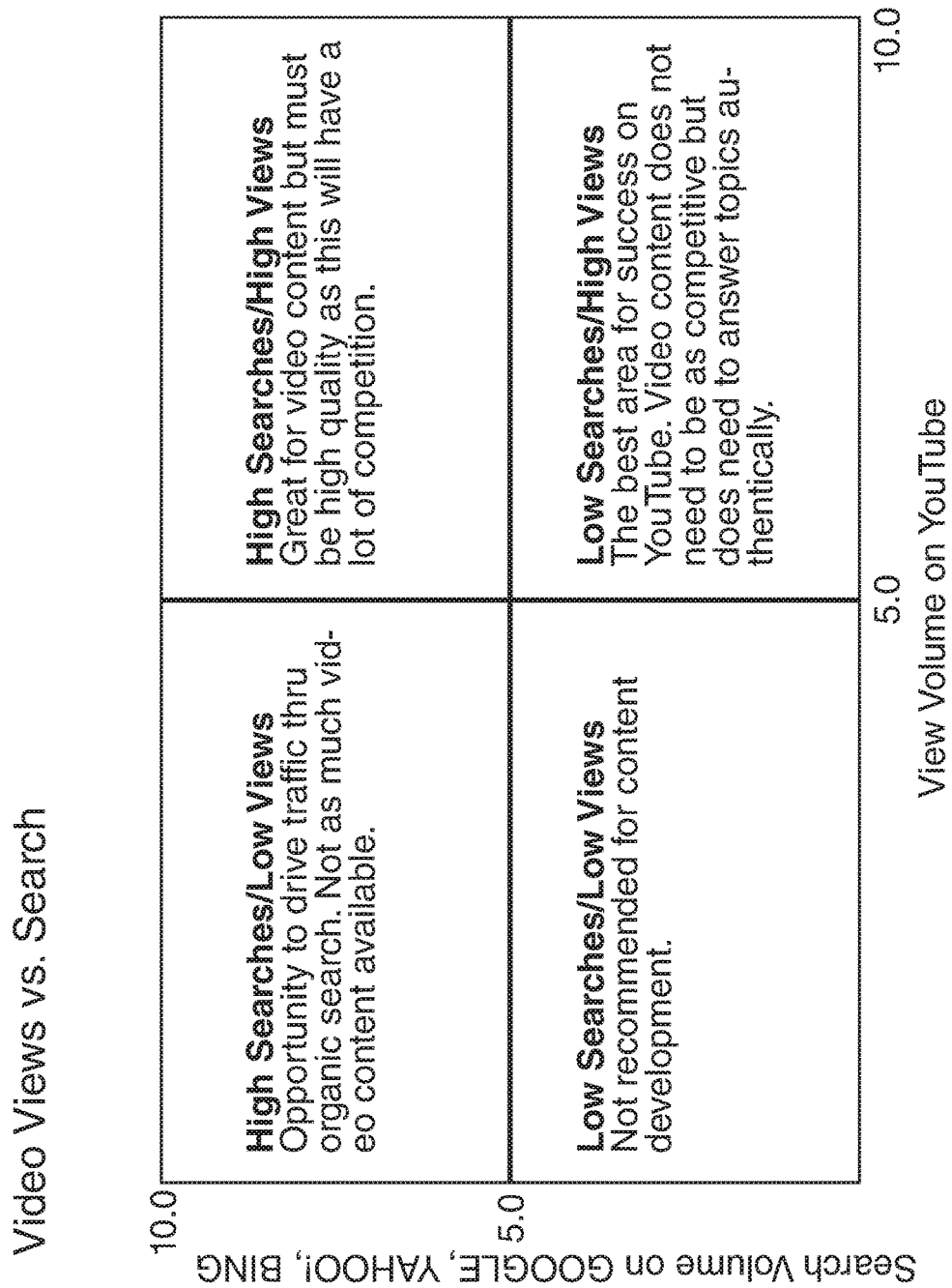
Figure 57:
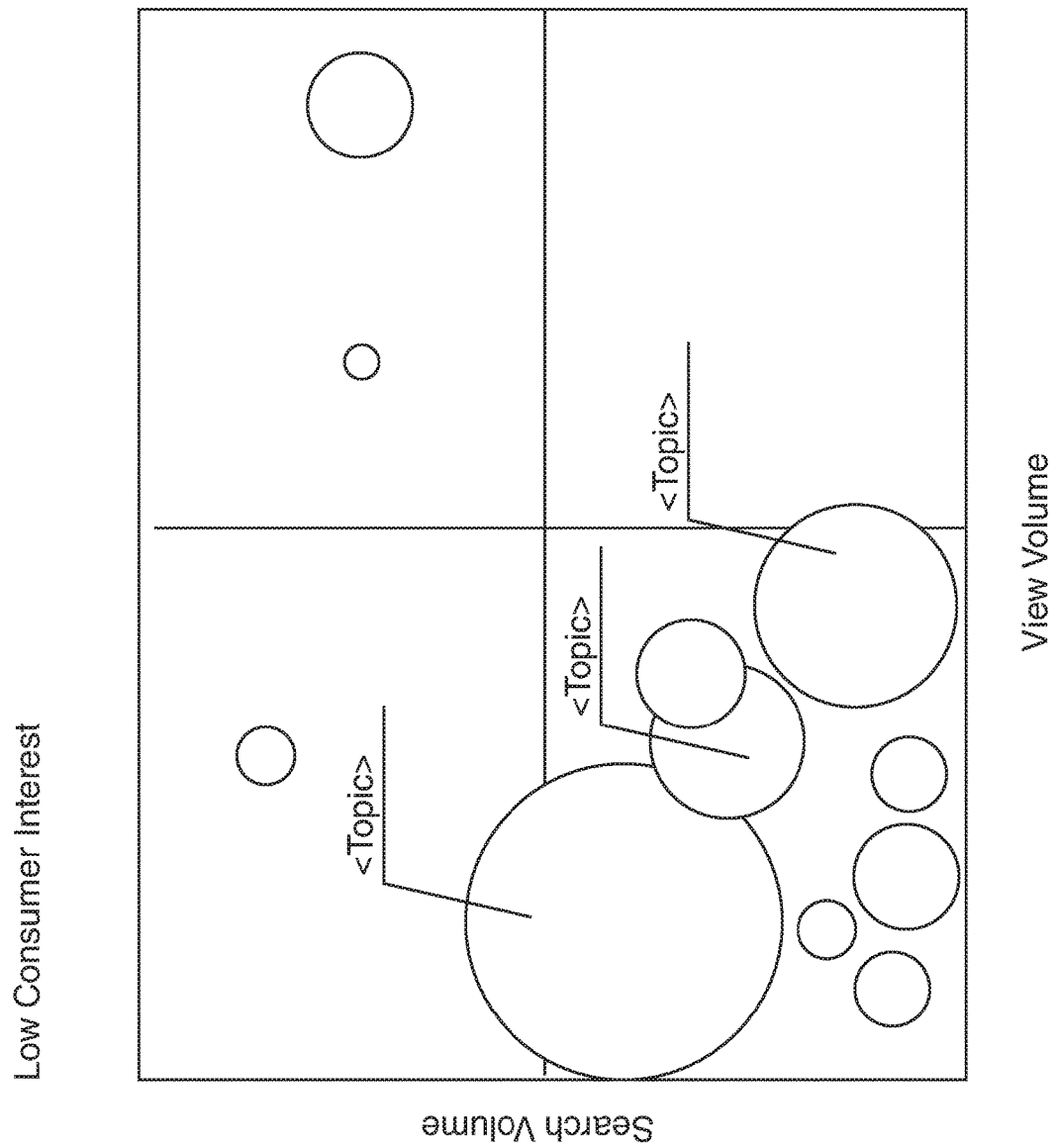
Figure 58:
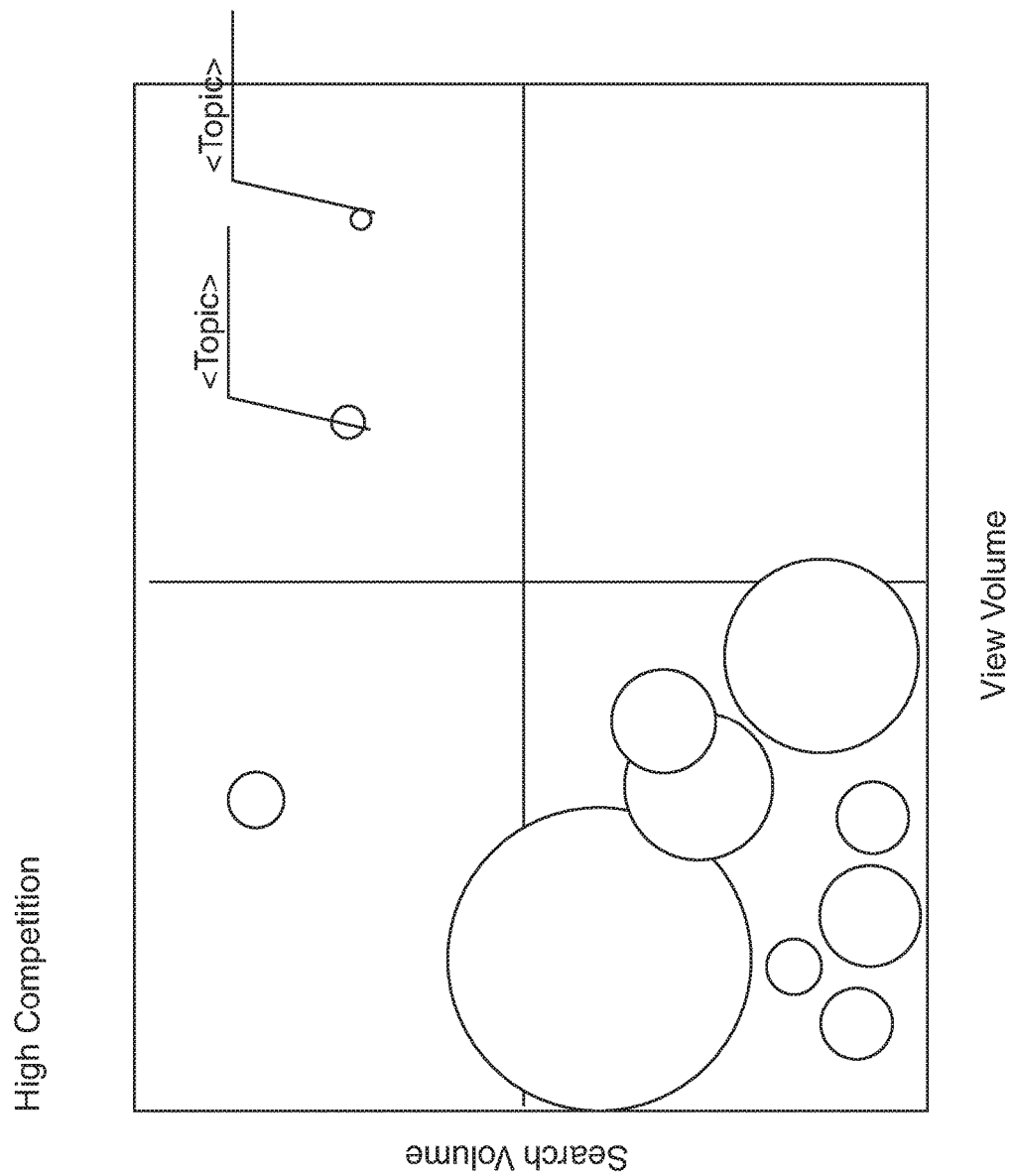
Figure 59:
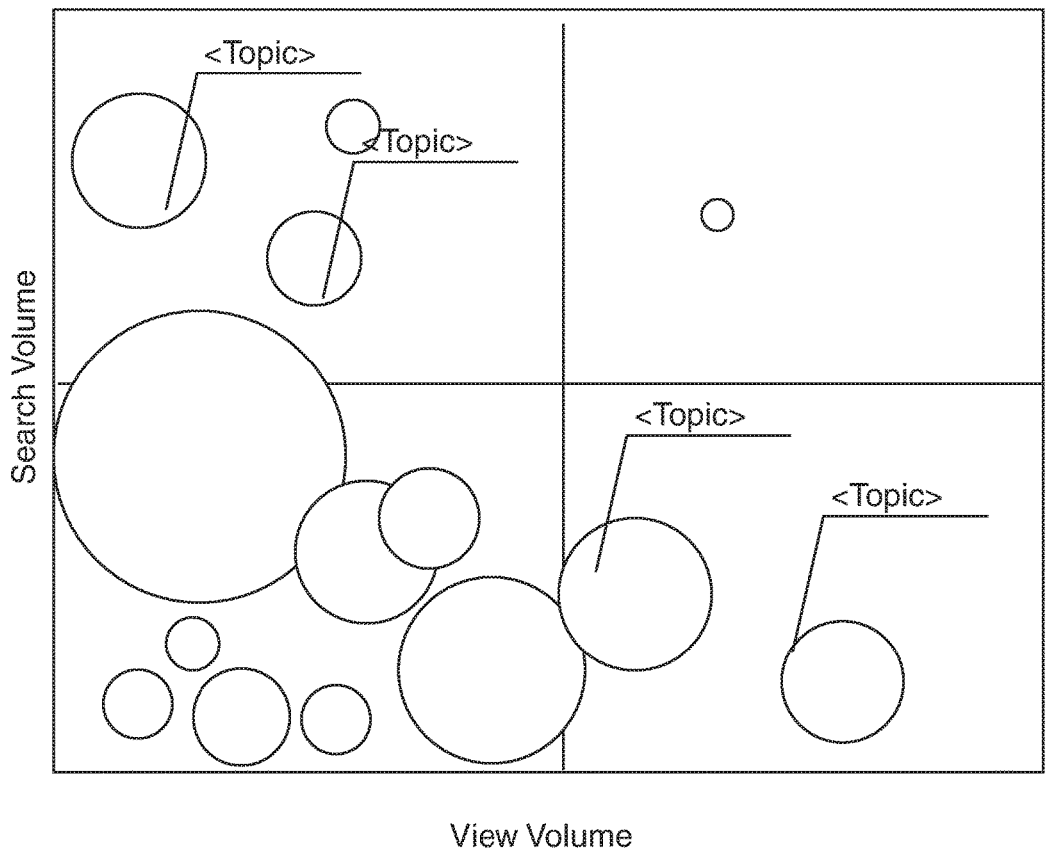
Figure 60:
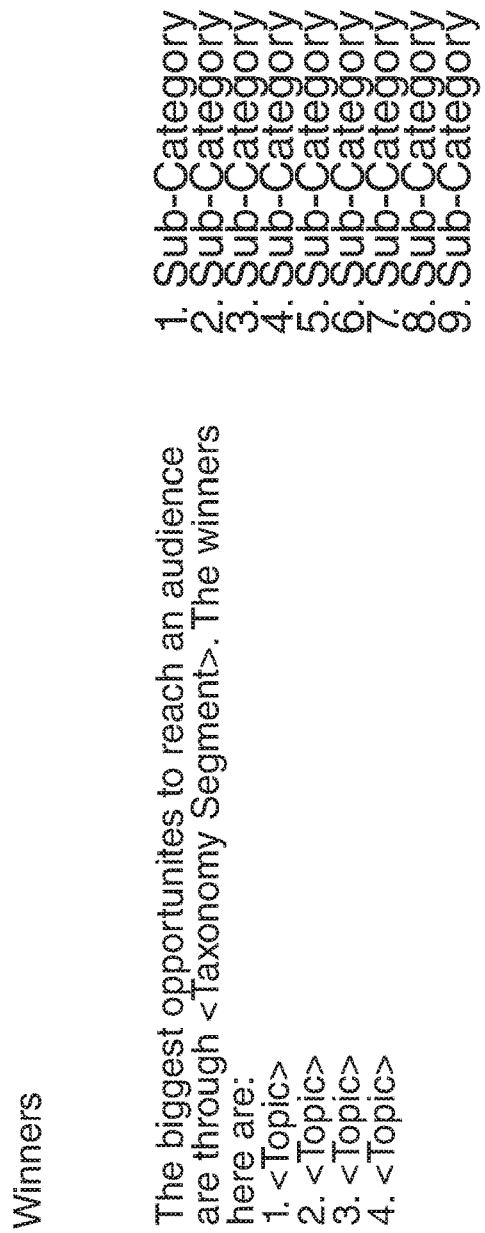
Figure 61:

FIG. 21 depicts an interface used in managing the taxonomy described more fully elsewhere in this specification. Administrators of the system, via the graphical user interface, may change the structure of the taxonomy by adding, deleting and combining categories. Administrators may also move various data from one category to another.

Playlist Generator

In another aspect of the invention users can create playlists automatically based on keywords and/or tags, which may or may not be tied to segments of the taxonomy. FIGS. 22 through 26 show interfaces used in this functionality. Once the user specifies the keywords within the system, the system will return a list of videos associated with one or many content platforms as specified by the user with such content platforms having been integrated into the system. The user will indicate which videos to include in their playlist. The system will automatically generate the playlists and publish them, according to the user preference, which may be directly onto the user's channel of any platform associated with the system or to a third party website via an embeddable link.

The order of videos in the playlist and other playlist features made available by an online content platform may be optimized based on any measure tracked by the system such as audience retention and view/engagement velocity using algorithms employed by the system. Within the system, the user may specify automatic or manual re-optimization with re-optimization occurring on a frequency either set by the user or the system for a duration that includes in perpetuity.

Profile and Claim Channels

In some embodiments the system develops categorization and profile data regarding YouTube™ channels at a variety of levels of detail, and data fetched from YouTube™ is combined with the data developed independently by the system for use by clients (users who interact with the system in their promotional activity in YouTube™). Tools are provided in the system through the interactive interfaces enabling a user to overwrite and change categories and profiles, and to claim their own channels and lock down the categories and profiles.

Posting Changes to the Content Platforms

Users may configure their settings on the system to write back to YouTube™, essentially through the interface between the system and YouTube™, when certain data or account thresholds are met. The process of writing back to YouTube™ can be enabled automatically for a system user or the user may manually approve each instance. For example, in monitoring comments made by others regarding a channel, once a user sees comments that meet the user's filter criteria, the user is enabled to delete those comments from their YouTube™ channel through tools provided in the system. As another example a user may set a minimum threshold of daily views of a particular playlist. In the instance where the daily views fall below the set threshold, the system will consider if the daily views were higher when associated with other previously stored metadata. In this case, the system may alert the user of the occurrence and may revert to the saved metadata, either automatically or by a manual user action, with such implementations occurring on the users channel on YouTube™.

Ratings

FIGS. 27 through 30 are exemplary screenshots used in a Ratings Module functionality. The Ratings Module enables the user to display data using such filters as a segment within the marketing taxonomy, predefined groupings such as music channels, movie channels, comedy channels, video gaming channels, top brand channels, and custom groups of channels as specified by the user. The ratings module displays data in rank order against any dimension stored in the system's database. These dimensions may be raw data or calculated data known to the system. This module may also enable the user to define calculations and input them into the system and have the system supply back a result of that user defined calculation with system data in ranked order. The data displayed includes but is not limited to raw data such as views, subscribers, likes, number of comments, number of videos in a channel, video upload date and calculated measures such as view density, subscribers per million views, likability, dis-likability, upload frequency, channel scores, and a brand's earned mentions across a content platform.

The data displayed may be presented in charts, graphs, lists or any other visual display. The user also has the ability to manipulate the ranking report by choosing which combination of measures the user would like displayed and upon which measure the user would like the ranking to be applied. The rank report may also contain information about the particular segment or group from which the ranking report is derived.

Channel Report

FIGS. 31 through 41 are exemplary screenshots used in a Channel Report functionality. The user specifies a particular channel of interest and affirms or changes the classifications associated with the channel. The user then requests the report from the system. The system displays a report, which provides the user with a set of data that reveals in depth information about that channel. The data may include raw data, calculated data, graphs, charts, data about the segments of the taxonomy that the channel is associated with, comparative data with comparisons between channels within the particular online platform or comparisons between channels from different platforms. The Channel Report may include analysis of any of the data, explanations of the metrics provided and the ability for the user to print or download information from the system. Depending upon the user's permissions as set by the system to access data from the system, the user may be presented with options to generate additional data from the system by providing the system with additional data, by purchasing the data or by earning credits generated by the system.

Share of Search

FIG. 42 is an exemplary screenshot of a Share of Search report. Using this report, the user has an ability to determine the share of search volume it has achieved for specific keywords or a group of keywords in total. Share of Search is defined as the number of times a particular entity's, such as a brand's, content appears in a particular segment of the search results displayed by a content platform, based on any number of keywords used in the search query. For example, if a brand has four search results 5 on page one of You-Tube™ for a search query using a particular keyword, and there are 20 search results shown on page one, it could be said that the brand has a 20% share of search for page one results. Additionally, the user can compare the user's share of search between distinct time periods and reveal growth or decline in values.

Comparisons

In this module, the user has the ability to select any type of content tracked by the system such as content channels, and additionally select more than one instance of that type of content and generate a report that compares the instances. The system may provide a set of data points to display in the comparison report. The user may have the ability to change the selection of data points and manipulate the display of results.

Brand Tracker/Earned Media Mentions

In some implementations of the invention YouTube™ channel owners can access YouTube™ analytics, which detail the performance metrics for the videos housed on their channel. For brand advertisers and certain personalities, this is only one piece of the picture. It is common practice for "product review channels" to give commentary on a branded product. It is common practice for a channel owner to demonstrate product usage, using a branded product, and to mention that branded product. When a brand is mentioned by someone else, on a channel not belonging to the brand, this is called Earned Media. Earned Media is one of the big three things brands want to track in what's called the "Paid, Earned, Owned" marketing model. Tracking these Earned Media mentions is a massive task that only technology can do. In implementations of the invention hundreds of millions of videos may be reviewed in relatively short order, and a variety of statistics are created as an outcome: who talked about the brand, how valuable/credible is the speaker, has that speaker mentioned the brand many times or just a few, if the mention was a review was it a positive review, and so forth. The statistics are manipulated in various ways to be presented as values that brands can understand.

Competitive Spending Report

Since the dawn of mass media, brands have been trying to associate their marketing spending with their sales results. Although there are many reasons that is very hard to do, brands have come to rely on a calculation that is fairly predictive called Share of Voice. In traditional media, there are companies that track the spending in various mediums, such as television for example, against categories, like Fast Food. McDonald's, for example, will subscribe to those reports. They may know, for example, that every month their Share of Voice is 28.642% in television. When a new entrant starts spending, say, fast food companies such as SONIC™, MCDONALDS™, will see its Share of Voice drop in the reports, and they become aware that if they want to hold onto the same market share of sales, they will have to spend more to resume their former Share of Voice. Despite the widespread use of this data in traditional media, there is very little of it in new media. In fact, to the contrary, YouTube™ has obscured the numbers from brands by reporting video view counts that include both paid and organic views. For example, a brand like PANTENE™ may not be advertising much on YouTube™, but because they have great hair content, their view counts are growing organically. Then DOVE™ comes along with a viral video, and achieves an astronomical view count, leaving everyone to wonder if those views came organically, or if DOVE™ bought their way to success. This confuses brands badly. They can't decide whether they need to make better videos and promote organically, or whether they need to advertise on YouTube™ more. In one embodiment of the present invention there is a new and novel report that shows brands by category, and what their share of voice is for both paid and organic media on YouTube™. This report draws on the Taxonomy created by the inventors to put brands in proper categories. It also draws on a giant repository of data that has facilitated understanding trends that reveal paid vs. owned views. Algorithms in embodiments of the invention are created from the statistics to develop final conclusions for reports.

Custom Network Builder and Talent/Partner Finder

In some embodiments of the invention the user has an ability to query the system with specific criteria or filters to render a set of results, such as a list of channels, that fit that specific criteria. One example is to select various segments of the taxonomy, set a threshold on a data point calculated by the system, such as channel score, specify certain other data points such as a profile data point like language or producer type, and render a result such as a list of channels that fit that criteria. In one application a list of channels is identified as deemed to be of a certain quality where the user may wish to place advertisements. In another application a list of channels is identified that are deemed to be of a certain quality where the user may wish to generate a business partnership with one or more channels identified in the results. The user is enabled to add on additional dimensions such as, but not limited to, the reviewer dimension tracked by the system, to provide more refined results when seeking a particular type of partner.

The system in some embodiments also enables the user to input certain data in response to the results displayed in order to act on the results. In the case of the partnership, the user may input a dollar amount or bid the user wishes to propose for securing a business arrangement. The system enables the user to agree to certain terms that govern that arrangement. The system enables the user to complete the transaction. The system provides outgoing communication to both parties in the transaction. The system enables channel owners to opt into an arrangement to become part of this deal making and agree to certain terms and conditions. The system also reaches out to all the partners who have opted in and makes them aware of the offer.

In some embodiments activity is measured, dashboards are provided for all parties to an agreement, that may be a facility for offers and counter-offers, and there may be a bidding system as well. Results may be exported from the system via a variety of methods including but not limited to XML, CSV, PDF. The system may be configured to provide the results to external systems via an API.

Custom Report Generator

The system offers the user an ability to configure custom reports whereby the user may specify any type of data measured by the system, specify any type of data display made available by the system, and specify any type of export function made available by the system.

Channel Profile Pages/Channel Directory

FIGS. 43 through 52 depict interfaces used in searching for and profiling and reporting on channels. In some embodiments users are enabled to search for instances, such as content channels on YouTube™, and to render results which show in-depth information about that particular channel including any data stored in the system. The data may be presented in a variety of ways including charts, graphs, tables, and images, and the various data points may be organized into groupings that render additional data. An authenticated owner of a particular channel is enabled to edit selected results displayed about the channel the owner is authenticated to, such as the channel description. In some embodiments information about the channel may be imported from other sources, such as Wikipedia. Users are enabled to indicate additional channels they wish to compare to the originally selected channel. Various data points may be presented in this comparison and may enable the user to select data points for display. Channel profile pages may be exported from the system for sharing within social media or via email or other methods of sharing and transfer. This is one example of data export. Data may be exported from any module within the system.

Badges

In some embodiment of the invention widgets and data are provided that a user may export, such as a graphical element depicting a badge which contains data generated by the system, such as a channel score and related date and channel information. Some elements may be exportable only by an authenticated user with other elements exportable by any user of the system. Exported elements may be posted on online venues for display with functionality, such as links, that enables a viewer of the exported element to click through to return back to the system.

Topic Finder

FIGS. 53 through 60 depict interfaces used in a topic finding functionality in an embodiment of the invention. In this functionality what may be termed "holes" in a market may be revealed; insights that may be highly useful for figuring out what content to make that might win. The system may classify search data including keywords and search volume, from third party search engines such as Google™, Yahoo™, and Bing™, and compare this data with other data known to the system also classified into the same taxonomy to reveal comparisons between data points provided by both third party systems. This process may provide the user of this system with information about what the general public is searching for and how robust or not the third party platform is meeting that user demand for specific content topics defined in the system's taxonomy. This module reveals areas where there are holes or saturation in the market.

As an example of data provided in embodiments of the invention for users to more fully enhance probability of success in marketing through video presentation in a venue like YouTube™, a study of 500 beauty videos on YouTube™ revealed a trend toward "costume/theater" (Barbie, Vampire, Disney, Sailor Moon, Zombie, Fake Abs, etc.). Ongoing studies of this sort in embodiments of the invention provide further aid to users in their marketing efforts. Tools are provided in embodiments of the invention for users to take advantage of this derived knowledge in creating and managing their own campaigns.

System User Account Preferences

In some embodiments of the invention various aspects of the database are identified with which users may associate with their user accounts as a preference, which enables returning users to essentially create a customizable experience with the system.

Channel Manager Action Tracker

In one embodiment of the invention, when a user has authenticated credentials with a third-party platform, a log of all actions the user has taken with the third party platform may be kept and stored. Those actions may be compared to actions taken by other users, and other data stored in the system may be considered to make recommendations or display various reports designed to impact the user's performance with the third-party platform.

Earning and Burning Credits

In one embodiment users may earn credits or points for performing certain actions on the system such as, but not limited to, profiling a channel. Credits or points may be stored in a user account, which is uniquely associated with each user of the system. Users may deplete their earned credits or points by allocating them toward certain uses, such as, but not limited to, viewing a report.

Live Guide

In some embodiments different types of content delivery on a third party platform, such as live streaming, may be identified and users may be enabled to receive alerts via email, SMS, or other methods of communication, when such content types are available. Users may also browse within the system to discover certain content types such as live streaming or other types.

Channel Mining

FIGS. 61 through 64 depict interfaces used in channel mining in an embodiment of the invention. In one embodiment of the invention Channel Mining, executed by a system administrator, is provided using the following steps:

Using a GUI, a category to mine is selected from the system's taxonomy by an administrator.

The administrator instructs the generation of a list of keywords

Using the taxonomy, which is universally applied to all types of data brought into the system, including search terms from search engines, a list of keywords associated with the category to mine is retrieved from the data repository.

The administrator may select keywords from this list and add additional keywords.

The administrator may identify negative keywords to indicate that the results returned do not pull for particular keyword(s).

The administrator may specify how many results to be returned against each keyword.

A search within YouTube™, for example, is performed for each keyword in the list. For each video identified via the query, all videos in the channel are considered by algorithms known to the system and added to the result set.

A set of videos and their associated channels are returned, up to the limit set by the administrator.

The results are further refined by de-duping any channel already in the system database.

Certain data points about the channel results returned are evaluated to determine whether the channel meets certain criteria indicating the channel should be added to the system database associated with the taxonomy segment used to generate this function.

The system takes the resulting channel set and uses them to perform an additional query with YouTube™ in this example, to pick up channel tags associated with each channel in the above mentioned channel set. The process of mining for channels is then repeated using the aggregated channel tags as the new keyword list.

The channels are either directly added to the database or the administrator is given a GUI to review and confirm each addition manually.

A result of channel mining is the automated build-out of a channel set within the system's database for a particular topic within the taxonomy for channels and videos that exist on social media platforms.

Offline Data Integration—Movie Report Example

In some embodiments custom data may be imported from third party sources that can be integrated into the database in order to reveal new findings. One example is the import of motion picture box office sales data. This data combined with viewing of movie trailers from a third party content platform such as YouTube™ may enable unique visibility revealing predictive and comparative information about the potential for movies.

Dimension Report

In some embodiments in addition to reports based on segments of the taxonomy, report data may be generated against any dimension tracked by the system. A dimension report may use data from multiple online content platforms and may reveal such things as which videos are most likable within a single platform or across multiple platforms. The use of likeability as a dimension is for representative purposes only, and this may be applied to any data point or dimension tracked by the system.

Platform Changes

In certain embodiments of the system, the system may recognize changes to content platforms that have been configured into the system. Such changes may be things like channel structure changes. The system identifies all channels that experience the change and may generate data that configures with other third party platforms, such as a marketing platform, to generate actions such as deployment of an out-bound marketing message, such as emails or alerts, to individuals such as channel owners affected by the change.

The system also enables channels affected by the change occurring on the third party platform to make a transition more easily using functions provided by the system such as porting content that resides on the deprecated aspect of the channel to a new aspect of the channel.

It will be apparent to the skilled artisan that the embodiments described above are not limiting, and that YouTube™ has been used as an example of a content platform that may be used by enterprises and persons to promote products and services, and that results-tracking and projection may be provided for YouTube™ users through functionality of various embodiments of the present invention. Similar functionality may be provided for users of many other sorts of presentation and online network platforms wherein data of dynamics in those platforms may be accessed and used in tools of the present invention. The examples above are related to video presentations, but the unique functionality described may be applied just about in any venue where any sort of content may be presented and tracked.

The invention claimed is:

1. A video content optimization system for content and advertisement placement improvement on a third party media content platform, comprising:

an Internet-connected server including a physical computer processor and a data repository, the processor configured to execute a web-based software application from a non-transitory physical medium, wherein the Internet-connected server is enabled for two-way communication with the third party media content platform to access and retrieve a data set from a plurality of user video content account channels via an application program interface, wherein each user video content account channel of the plurality of user video content account channels comprises at least one uploaded video and a first data set including first metadata associated with both the at least one uploaded video and the video content account channel; and a graphical user interface via the web-based software application configured to enable a plurality of users and a plurality of advertisers access to the video content optimization system;

a graphical user interface enables an authenticated user an ability to claim ownership of a video content account channel of the plurality of user video content account channels;

the graphical user interface is configured to enable the authenticated user a data addition tool enabling a second data set to be associated with the claimed video content account channel, wherein the second data set is in addition to the first data set, and is not created from the third party media content platform, the second data set including second metadata, the second metadata including at least one keyword associated with at least one of the claimed video content account channel and the at least one uploaded video;

the graphical user interface is configured to enable the authenticated user access to a creation of a custom taxonomy enabling the claimed video content account channel to be classified into a plurality of categories having a plurality of sub-categories having a plurality of sub-sub categories having a plurality of sub-sub-sub categories;

the graphical user interface is configured to enable the authenticated user access to perform a search of the third party media content platform for:

(a) one or more of the video content account channels;
(b) the at least one uploaded video; or,
(c) one or more of the video content account channels and the at least one uploaded video;

wherein the search is defined by a first criteria and at least one search term, the search generating search results which are stored in the data repository, wherein the search results provide a search ranking indicating a numerical ranking score corresponding to a search position for the one or more video content account channels or the at least one uploaded video within the search results, wherein the search position is sorted in descending order by the numerical ranking score;

the video content optimization system configured to apply the custom taxonomy to the search results, and automatically modify the at least one keyword to improve the ranking score of the one or more of the video content account channels, or the at least one uploaded video, or both the one or more of the video content account channels and the at least one uploaded video;

the graphical user interface is configured to enable the plurality of advertisers access to query the video content optimization system with a second criteria to render a filtered list of user video content account channels from the plurality of user video content account channels, wherein the filtered list of user video content account channels correlate to advertisement placement targets.

2. The video content optimization system of claim 1, wherein the video content optimization system is configured to automatically create an optimized video playlist based on the at least one keyword.

3. The video content optimization system of claim 2, wherein the at least one keyword is tied to a category of the custom taxonomy.

4. The video content optimization system of claim 2, wherein the video playlist is optimized using at least one algorithm based on at least one measure tracked by the video content optimization system, wherein the optimized video playlist is automatically uploaded to the third party media content platform such that the video content account channel is optimized.

5. The video content optimization system of claim 4, wherein the at least one measure is one or more of subscribers per million views, video velocity, and likability.

6. The video content optimization system of claim 2, wherein the optimized video playlist is re-optimized automatically on a predetermined frequency.

7. A method for video content optimization for improved content and advertisement placement on a third party media platform, comprising:

(a) providing a video content optimization system comprising an Internet-connected server including a physical computer processor and a data repository, the processor configured to execute a web-based software application from a non-transitory physical medium, the web-based software application having a graphical user interface, wherein the Internet-connected server is enabled for two-way communication with the third party media content platform to access and retrieve a data set from a plurality of user video content account channels via an application program interface, wherein each user video content account channel of the plurality of user video content account channels comprises at least one uploaded video and a first data set including first metadata associated with both the at least one uploaded video and the video content account channel;

(b) enabling, via the graphical user interface, an authorized user access to the video content optimization system;

(c) claiming, by the authorized user via the graphical user interface, a video content account channel of the plurality of user video content account channels;

(d) associating, by the authorized user via the graphical user interface, a second data set with the claimed video content account channel via a data addition tool, wherein the second data set is in addition to the first data set, and is not created from the third party media content platform, the second data set including second metadata, the second metadata including at least one keyword associated with both the claimed video content account channel and the at least one uploaded video;

(e) accessing, by the authorized user via the graphical user interface, a creation of a custom taxonomy enabling the claimed video content account channel to be classified into a plurality of categories having a plurality of sub-categories having a plurality of sub-sub categories having a plurality of sub-sub-sub categories;

(f) searching, by the authorized user via the graphical user interface, the third party media content platform for:
 (i) one or more of the video content account channels;
 (ii) the at least one uploaded video; or
 (iii) one or more of the video content account channels and the at least one uploaded video;

wherein the search is defined by a first criteria and at least one search term;

(g) generating, via the video content optimization system, search results, the search results providing a search ranking indicating a numerical ranking score corresponding to a search position for the one or more video content account channels or the at least one uploaded video within the search results, wherein the search position is sorted in descending order by the numerical ranking score;

(h) storing, via the video content optimization system, the search results in the data repository;

(i) applying, via the video content optimization system, the custom taxonomy to the search results; and, (j) automatically modifying, via the video content optimization system, the at least one keyword to improve the ranking score of the one or more of the video content account channels, or the at least one uploaded video, or both the one or more of the video content account channels and the at least one uploaded video; and (k) enabling, via the graphical user interface, a plurality of advertisers access to query the video content optimization system with a second criteria to render a filtered list of user video content account channels from the plurality of user video content account channels, wherein the filtered list of user video content account channels correlate to advertisement placement targets.

8. The method for video content optimization of claim 7, further comprising a step of automatically creating an optimized video playlist based on the at least one keyword.

9. The method for video content optimization of claim 8, wherein the at least one keyword is tied to a category of the custom taxonomy.

10. The method for video content optimization of claim 8, further comprising a step of optimizing, via at least one algorithm, the video playlist based on at least one measure tracked by the video content optimization system, wherein the optimized video playlist is automatically uploaded to the third party media content platform such that the video content account channel is optimized.

11. The method for video content optimization of claim 10, further comprising a step of automatically re-optimizing the optimized video playlist on a predetermined frequency.

12. The method for video content optimization of claim 10, wherein the at least one measure is one or more of subscribers per million views, video velocity, and likability.

* * * * *